(12) United States Patent
Tokushima et al.

(10) Patent No.: US 8,711,427 B2
(45) Date of Patent: Apr. 29, 2014

(54) IMAGE PROCESSING APPARATUS, IMAGE FORMING SYSTEM, AND COMPUTER-READABLE STORAGE MEDIUM

(75) Inventors: Yuji Tokushima, Kanagawa (JP); Hiroaki Suzuki, Chiba (JP)

(73) Assignee: Ricoh Company, Limited, Tokyo (JP)

(*) Notice: Subject to any disclaimer, the term of this patent is extended or adjusted under 35 U.S.C. 154(b) by 0 days.

(21) Appl. No.: 13/611,729

(22) Filed: Sep. 12, 2012

(65) Prior Publication Data

US 2013/0070260 A1 Mar. 21, 2013

(30) Foreign Application Priority Data

Sep. 16, 2011 (JP) ................................. 2011-203728
Aug. 7, 2012 (JP) ................................. 2012-175356

(51) Int. Cl.
*G06K 15/02* (2006.01)

(52) U.S. Cl.
USPC .......................................................... 358/1.2

(58) Field of Classification Search
CPC ................... G03G 15/6585; G03G 2215/0081
See application file for complete search history.

(56) References Cited

U.S. PATENT DOCUMENTS

| 5,317,679 A | 5/1994 | Ueda et al. |
| 2012/0062956 A1 | 3/2012 | Kitagawa et al. |
| 2012/0063802 A1 | 3/2012 | Suzuki et al. |

FOREIGN PATENT DOCUMENTS

| JP | 04-081170 | 3/1992 |
| JP | 3142550 | 12/2000 |
| JP | 3473588 | 9/2003 |
| JP | 2010-194979 | 9/2010 |

*Primary Examiner* — Mark Zimmerman
*Assistant Examiner* — John Wallace
(74) *Attorney, Agent, or Firm* — Harness, Dickey & Pierce, P.L.C.

(57) ABSTRACT

An image processing apparatus includes an anti-aliasing processing unit configured to perform an anti-aliasing process on gloss-control plane image data that specifies a type of a surface effect applied to a recording medium and a drawing area to which the surface effect is to be applied to the recording medium and on color plane image data indicative of a drawing area of a color image. The anti-aliasing processing unit corrects a pixel value of each pixel in the color plane image data to a value obtained by multiplying the pixel value by a first area ratio of a drawing area of the color plane image data before rasterization in each pixel, and corrects a pixel value of each pixel in the gloss-control plane image data to a value obtained by multiplying the pixel value by an area ratio of 100 percent.

5 Claims, 26 Drawing Sheets

FIRST COLOR PLANE
IMAGE DATA

| GLOSSY EFFECT | GLOSSINESS | DEVIATION |
|---|---|---|
| PREMIUM GLOSS (PG) | Gs ≥ 80 | ΔGs ≤ 10 |
| GLOSS (G) | Gs = Gs (SOLID GLOSSY) | ΔGs ≤ 10 |
| MATTE (M) | Gs = Gs (1C30% HALFTONE) | ΔGs ≤ 10 |
| PREMIUM MATTE (PM) | Gs ≤ 10 | ΔGs ≤ 10 |

FIRST GLOSS CONTROL PLANE IMAGE DATA

▨ : PG SPECIFIED AREA (DENSITY VALUE 98%)

▧ : G SPECIFIED AREA (DENSITY VALUE 90%)

▤ : M SPECIFIED AREA (DENSITY VALUE 16%)

FIRST CLEAR PLANE IMAGE DATA

FIG.9

| TYPE OF SURFACE EFFECT | | DENSITY VALUE (%) |
|---|---|---|
| PG (PREMIUM GLOSS) | TYPE A | 98 |
| | TYPE B | 96 |
| | TYPE C | 94 |
| G (GLOSS) | TYPE 1 | 90 |
| | TYPE 2 | 88 |
| | TYPE 3 | 86 |
| | TYPE 4 | 84 |
| M (MATTE) | TYPE 1 | 10 |
| | TYPE 2 | 12 |
| | TYPE 3 | 14 |
| | TYPE 4 | 16 |
| PM (PREMIUM MATTE) | TYPE A | 2 |
| | TYPE B | 4 |
| | TYPE C | 6 |

FIG.11

| DENSITY VALUE (%) | DENSITY VALUE | TYPE OF SURFACE EFFECT | ON/OFF | Clr-1 | Clr-2 | Clr-3 | TYPE OF PRACTICABLE SURFACE EFFECT |
|---|---|---|---|---|---|---|---|
| 94% TO 98% | "238" TO "255" | PG | ON | INVERSE MASK 1 | no data | no data | PG |
| 84% TO 90% | "212" TO "232" | G | ON | INVERSE MASK m | SOLID | no data | G |
| 10% TO 16% | "23" TO "43" | M | ON | no data | halftone-n | no data | M |
| 0% TO 6% | "1" TO "17" | PM | ON | no data | no data | SOLID | PM |

201 DIAGONAL LINE
200 PURE WHITE PIXEL
LINE WIDTH n POINTS 201
204
200
LINE WIDTH n POINTS 205
206 (DENSITY VALUE × 75%)
207 (DENSITY VALUE × 100%)
205 (DENSITY VALUE × 30%)
201
200

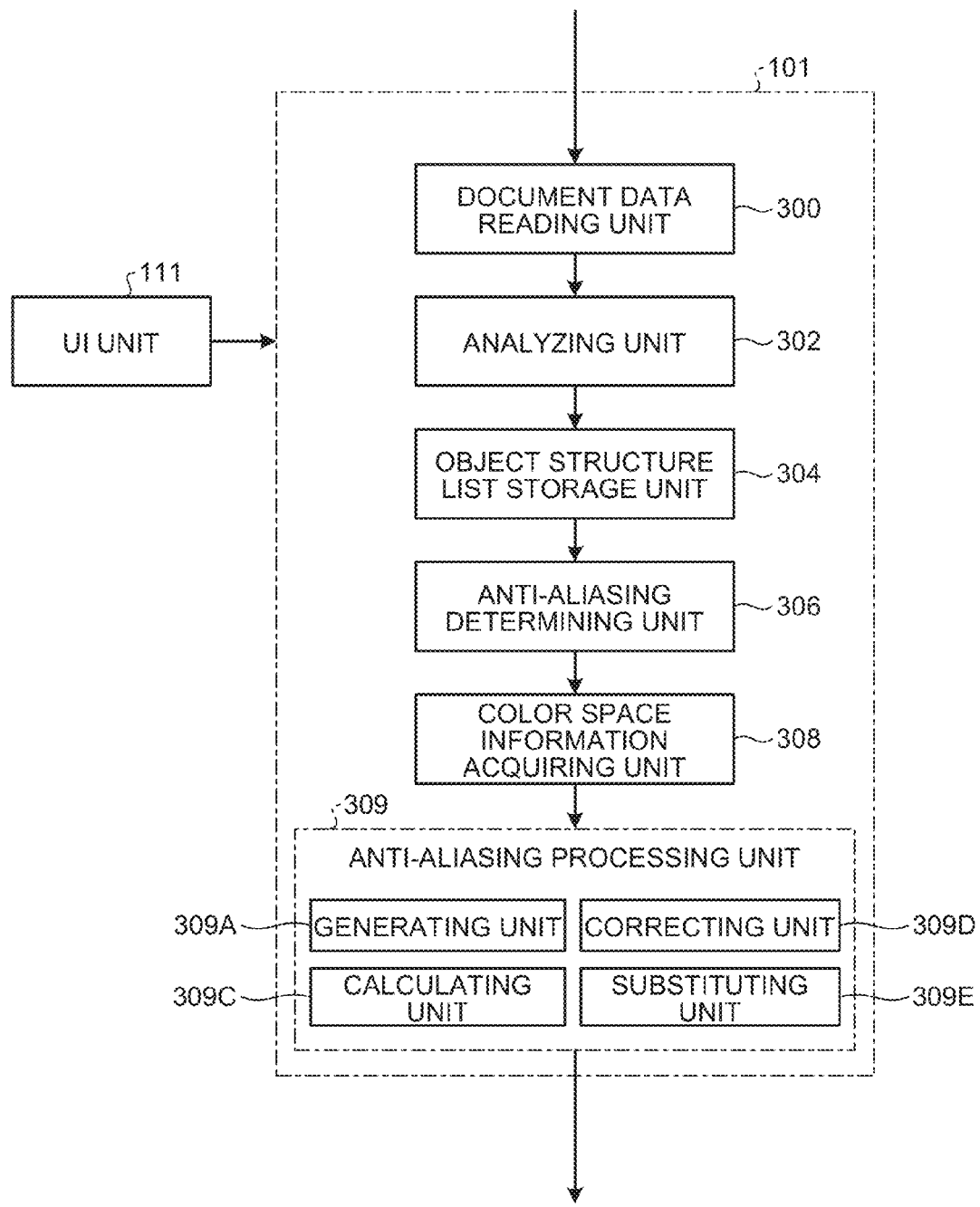

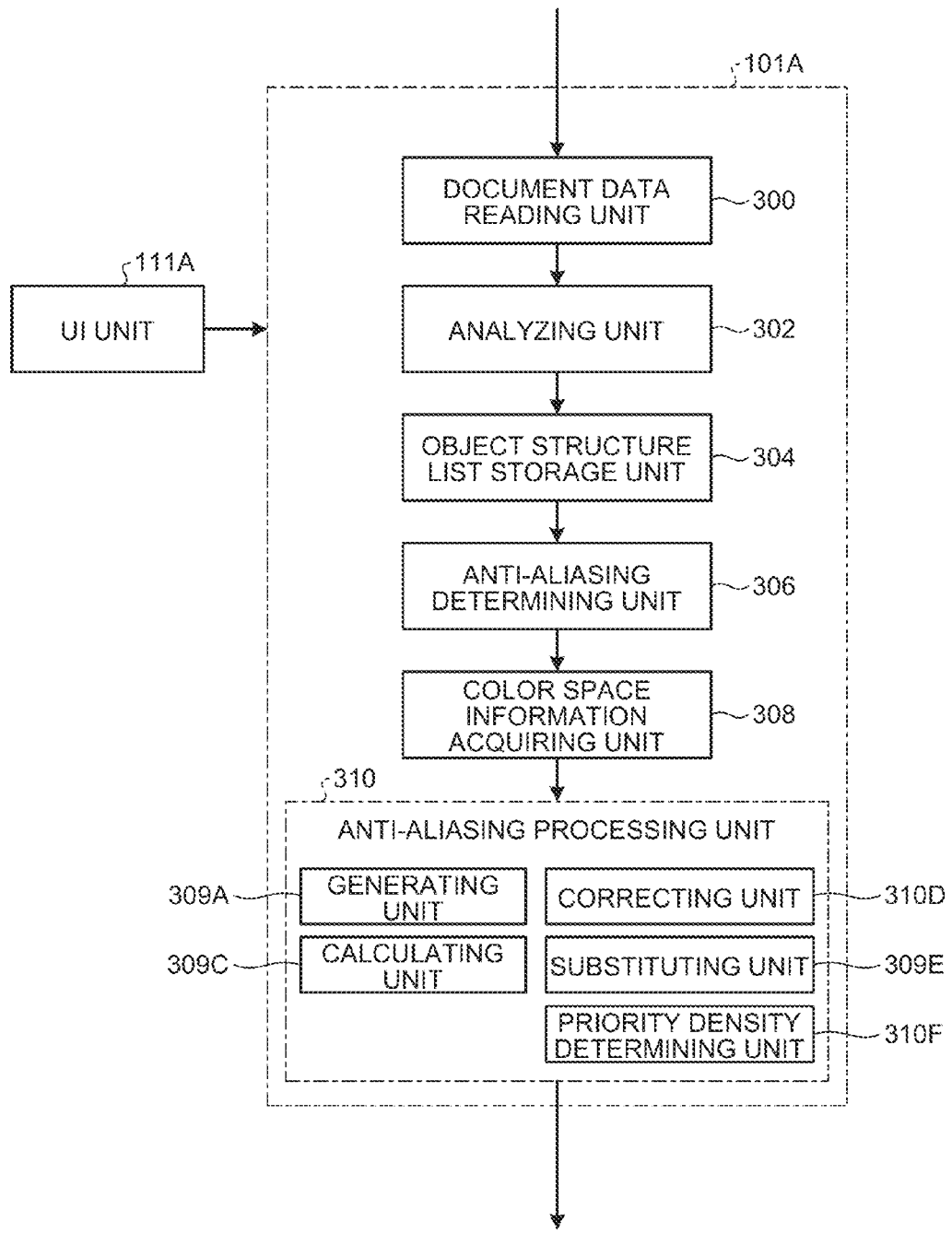

IMAGE PROCESSING APPARATUS, IMAGE FORMING SYSTEM, AND COMPUTER-READABLE STORAGE MEDIUM

CROSS-REFERENCE TO RELATED APPLICATIONS

The present application claims priority to and incorporates by reference the entire contents of Japanese Patent Application No. 2011-203728 filed in Japan on Sep. 16, 2011 and Japanese Patent Application No. 2012-175356 filed in Japan on Aug. 7, 2012.

BACKGROUND OF THE INVENTION

1. Field of the Invention

The present invention relates to an image processing apparatus, an image forming system, and a computer-readable storage medium.

2. Description of the Related Art

Conventionally, some image forming apparatuses have been developed to print images using a transparent developer besides the toners in four colors of CMYK (for example, see Japanese Patent No. 3473588). By the use of a transparent developer, a visual effect, or a tactual effect, on the surface of a recording medium (referred to as surface effect) is realized. Furthermore, forming an image using a transparent developer allows forming of a transparent image used for anti-falsification, anti-forgery, and such.

When a display device, a printing apparatus, or the like outputs a color image such as a graphic image and a character image and draws a diagonal line, a jagged and step-like portion (referred to as alias) appears. As a process to smooth out the alias portion, an anti-aliasing process that performs density correction on each pixel is known (see Japanese Patent No. 3142550).

On a drawing area to add a surface effect provided by a transparent developer, smoothing of an alias portion is achieved when an anti-aliasing process is performed. However, when the type of a surface effect for the drawing area is represented by a density value, a surface effect different from the specified type of the surface effect may be provided by the density correction in the anti-aliasing process. Accordingly, it has been configured such that the anti-aliasing process is performed on a drawing area of a color image but the anti-aliasing process is not performed on a drawing area to add a surface effect. Even though the specified type of the surface effect is not changed, this may in turn result, when the drawing area of the color image and the drawing area to add the surface effect are placed one on top of the other, in disagreement in the shape of end portions of the respective drawing areas.

Therefore, there is a need for an image processing apparatus, an image forming system, and a computer-readable storage medium that can suppress, when a drawing area of a color image and a drawing area to add a surface effect are placed one on top of the other, the shapes of end portions thereof from being in disagreement by an anti-aliasing process, and that can add a desired glossy effect to the area.

SUMMARY OF THE INVENTION

It is an object of the present invention to at least partially solve the problems in the conventional technology.

According to an embodiment, there is provided an image processing apparatus that includes an anti-aliasing processing unit configured to perform an anti-aliasing process on gloss-control plane image data that, specifies a type of a surface effect applied to a recording medium and a drawing area to which the surface effect is to be applied to the recording medium and on color plane image data indicative of a drawing area of a color image. The anti-aliasing processing unit corrects a pixel value of each pixel in the color plane image data to a value obtained by multiplying the pixel value by a first area ratio of a drawing area of the color plane image data before rasterization in each pixel, and corrects a pixel value of each pixel in the gloss-control plane image data to a value obtained by multiplying the pixel value; by an area ratio of 100 percent.

According to another embodiment, there is provided an image forming system that includes a printing apparatus; and an image processing apparatus. The image processing apparatus includes an anti-aliasing processing unit configured to perform an anti-aliasing process on gloss-control plane image data that specifies a type of a surface effect applied to a recording medium and a drawing area to which the surface effect is to be applied to the recording medium and on color plane image data indicative of a drawing area of a color image. The anti-aliasing processing unit corrects a pixel value of each pixel in the color plane image data to a value obtained by multiplying the pixel value by a first, area ratio of a drawing area of the color plane image data before rasterization in each pixel, and corrects a pixel value of each pixel in the gloss-control plane image data to a value obtained by multiplying the pixel value by an area ratio of 100 percent. The printing apparatus forms an image on the recording medium based on the corrected color plane image data and the corrected gloss-control plane image data.

According to still another embodiment, there is provided a non-transitory computer-readable storage medium with an executable program stored thereon. The program instructs a processor to perform performing an anti-aliasing process on gloss-control plane image data that specifies a type of a surface effect applied to a recording medium and a drawing area to which the surface effect is to be applied to the recording medium and on color plane image data indicative of a drawing area of a color image. The anti-aliasing process includes correcting a pixel value of each pixel in the color plane image data to a value obtained by multiplying the pixel value by a first area ratio of a drawing area of the color plane image data before rasterization in each pixel; and correcting a pixel value of each pixel in the gloss-control plane image data to a value obtained by multiplying the pixel value by an area ratio of 100 percent.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is a chart illustrating an example of a density value selection table;

FIG. 11 is a chart illustrating an example of a surface effect selection table;

FIG. 14 is a functional block diagram of a rendering engine;

FIG. 18 is a functional block diagram of an image processing unit according to a second embodiment;

DETAILED DESCRIPTION OF THE PREFERRED EMBODIMENTS

With reference to the accompanying drawings, embodiments of an image processing apparatus, an image forming system, and a computer-readable storage medium according to the present invention will be described in detail hereinafter.

First Embodiment

Figure 1:
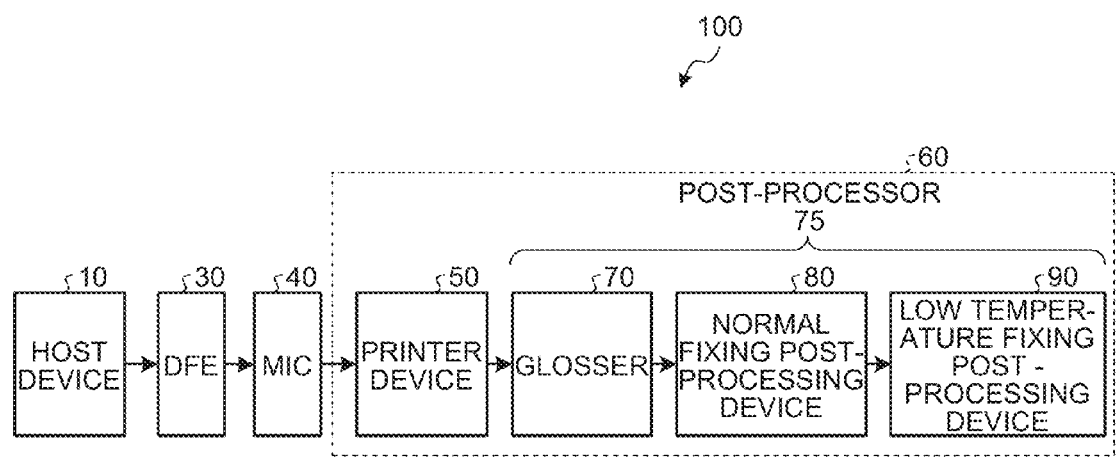
FIG. 1 is a block diagram schematically illustrating a configuration example of an image forming system.

FIG. 1 is a block diagram schematically illustrating a configuration example of an image forming system 100 according to a first embodiment. As illustrated in FIG. 1, the image forming system 100 includes a host device 10, a printer control device (a digital front end (DFE), referred to as a DFE hereinafter) 30, an interface controller (mechanism I/F controller (MIC), may be referred to as an MIC hereinafter) 40, and a printing apparatus 60. The host device 10, the DFE 30, the MIC 40, and the printing apparatus 60 are connected through a wired or a wireless communication line so as to transmit, and receive data to and from one another.

The host device 10 is configured with, for example, a personal computer (PC). The host device 10 may be configured to be connected to a communication line such as the Internet, and through the communication line, to be connected with the DFE 30 to transmit and receive data.

Figure 2:
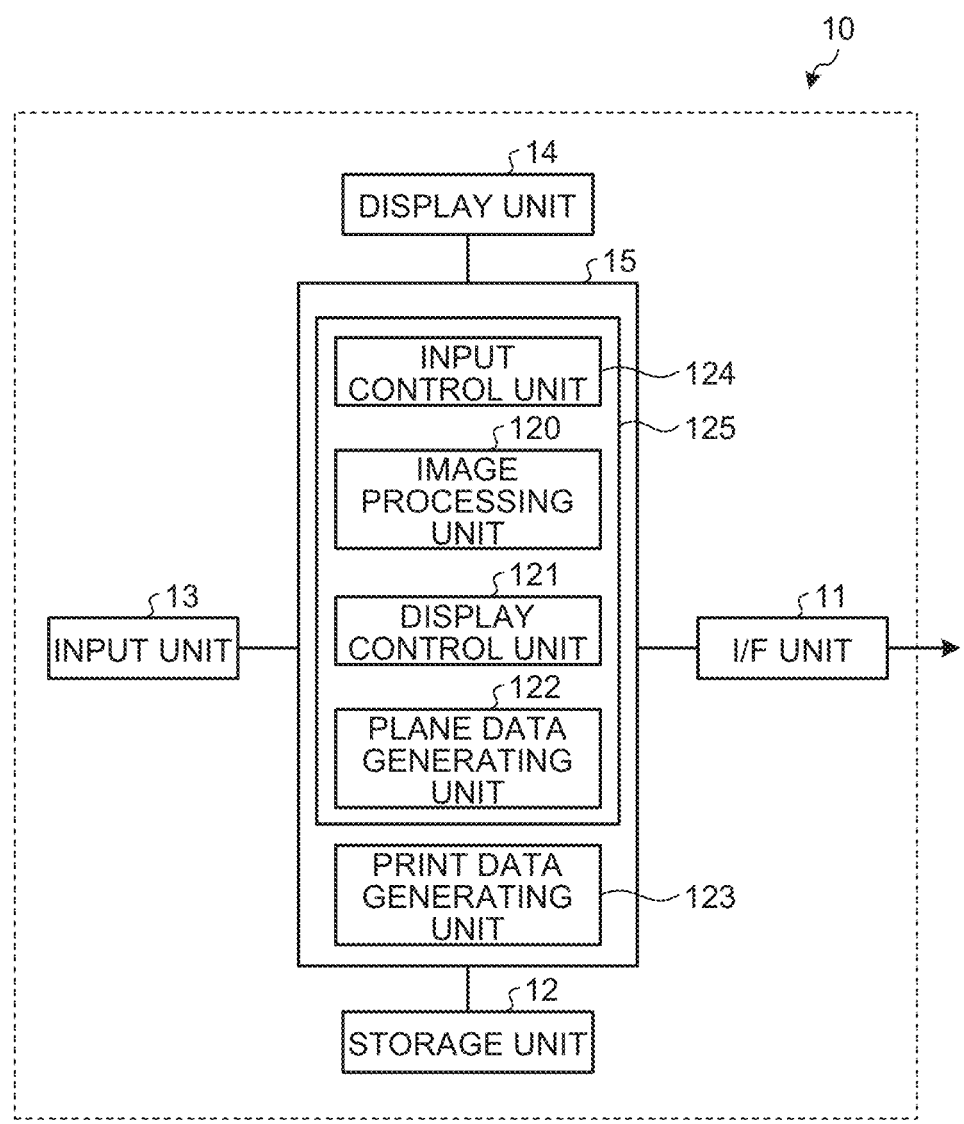
FIG. 2 is a block diagram schematically illustrating a configuration example of a host device.

FIG. 2 is a block diagram schematically illustrating a configuration example of the host device 10. As illustrated in FIG. 2, the host device 10 is configured to include an I/F unit 11, a storage unit 12, an input unit 13, a display unit 14, and a control unit 15. The I/F unit 11 is an interface device to perform communication with the DFE 30. The storage unit 12 is a storage medium such as a hard disk drive (HDD) or a memory that stores therein various types of data. The input unit 13 is an input device for a user to perform various input, operations and can be configured with, for example, a keyboard and a mouse. The display unit 14 is a display device to display various screens, and can be configured with, for example, a liquid crystal panel.

The control unit 15 controls the whole host device 10, and is a computer configured to include a central processing unit (CPU), a read only memory (ROM), a random access memory (RAM), and others. As illustrated in FIG. 2, the control unit 15 mainly includes a document data generating unit 125 and a print data generating unit 123.

The document data generating unit 125 generates document data and outputs the data to the print data generating unit 123. The print data generating unit 123 generates print data (described later in detail) based on the document data.

The document data is image data that includes first, color plane image data, first gloss-control plane image data, and first clear plane image data. While the document data is exemplified as the image data including the first color plane image data, the first gloss-control plane image data, and the first clear plane image data in the first embodiment, the document, data only needs to be the image data that includes at least the first color plane image data and the first gloss-control plane image data.

The first, color plane image data, the first clear plane image data, and the first gloss-control plane image data are generated, for example, in a portable document format (PDF) in units of pages. While the document data (the first color plane image data, the first clear plane image data, and the first gloss-control plane image data) is exemplified to be in a PDF format in the first embodiment, it is not limited to this. In each of the first clear plane image data, the first gloss-control plane image data, and the first color plane image data, each drawing area described later is expressed in vector format.

In more detail, the first color plane image data is the image data that represents a color image to print using color developers in vector format for each drawing area.

Figures 3, 4:
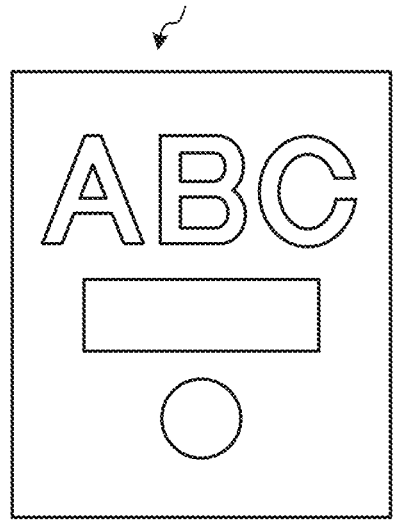
FIG. 3 is a diagram illustrating an example of image data for a color plane.
FIG. 4 is a chart illustrating types of surface effects concerning the presence or absence of gloss.

Specifically, the first color plane image data is image data that defines a density value of color such as RGB or CMYK expressed in vector format for each drawing area. FIG. 3 is an explanatory diagram illustrating an example of the first color plane image data. In FIG. 3, a density value corresponding to the user specified color is given to each of the drawing areas such as letters of A, B, and C. The density value of each drawing area is represented by a density value of, for example, 0 to 100 percent (may be represented by 0 to 255, or the like).

Examples of the color developers include liquids, toners, or the like that include respective color material of CMYK and others. In the first embodiment, exemplified is a situation where color toners that include, for example, the respective color material of CMYK are used as the color developers.

The first gloss-control plane image data is image data that represents the type of a surface effect and a glossy area to which the surface effect is to be applied in vector format for each drawing area. The surface effect is a visual or a tactual effect to be applied to a recording medium. The glossy area can be realized by adding a transparent developer to the recording medium.

The transparent developer is a colorless and transparent developer containing no color material. The term transparent and colorless means to indicate that the transmission factor of visible light is 70 percent or higher. In the first embodiment, exemplified is a situation where a transparent toner (hereinafter, referred to as a clear toner) is used as the transparent developer. The clear toner is a transparent toner containing no color material. The term transparent and colorless means to indicate that the transmission factor is 70 percent or higher.

The types of surface effects are exemplified, as illustrated in FIG. 4, to be broadly divided into four types of, in the order of higher degree of gloss (glossiness), Premium Gloss (PG) (mirror-surface glossy), Gloss (G) (solid glossy), Matte (M) (halftone matte), and Premium Matte, (PM) (delustered). More elaborate types of surface effects may be defined.

In the first gloss-control plane image data, similarly to the first color plane image data, the density value of each glossy area (drawing area) is represented by a density value of, for example, 0 to 100 percent (may be represented by 0 to 255, or the like). The density value corresponds to the types of surface effects. In FIG. 4, illustrated is that the "PG" has a glossiness Gs of 80 or higher, the "G" is a glossiness provided by a solid color of a primary color or a secondary color, the "M" is a glossiness of 30 percent halftone dots in a primary color, and the "PM" has a glossiness of 10 or less. The deviation of glossiness is represented by ΔGs and is defined as 10 or less. For the respective types of surface effects, a higher density value corresponds to the surface effect that provides a higher degree of gloss and a lower density value corresponds to the surface effect that suppresses gloss.

Which area of a color image the surface effect is applied to and which type of a surface effect is applied to the area are specified by a user (described later in detail).

Figure 5:
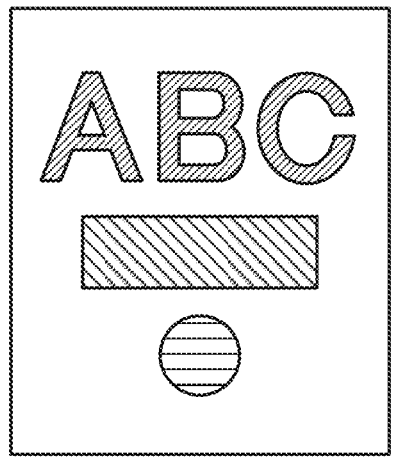
FIG. 5 is a diagram illustrating first gloss-control plane image data as an image.

FIG. 5 is an explanatory diagram illustrating an example of image data for the first gloss-control plane. In the example of the first gloss-control plane image data in FIG. 5, illustrated is an example where the surface effect "PG" (mirror-surface glossy) is applied to the drawing areas of letters A, B, and C, the surface effect "G" (solid glossy) is applied to the drawing area of a rectangular graphic, and the surface effect "M" (halftone matte) is applied to the drawing area of a circle graphic. The density values set to the respective surface effect are the density values defined corresponding to the types of surface effects with reference to a later described density value selection table.

The first clear plane image data is image data that represents a transparent image to print using a clear toner (transparent developer) in vector format for each drawing area. The transparent image means to indicate a drawing area formed using a clear toner in the area other than the glossy area to which a surface effect is to be applied. The transparent image includes, for example, a watermark.

Figure 6:
FIG. 6 is a diagram illustrating an example of first clear plane image data.

FIG. 6 is an explanatory diagram illustrating an example of the first clear plane image data. In the example in FIG. 6, a watermark "Sale" is specified as the transparent image.

Referring back to FIG. 2, the explanation is continued.

The document data generating unit 125 mainly includes an input control unit 124, an image processing unit 120, a display control unit 121, and a plane data generating unit 122.

The input control unit 124 receives various inputs from the input unit 13 (see FIG. 2) and controls inputs. For example, the user can input, by operating the input unit 13, image specifying information that specifies an image, more specifically, the first color plane image data (hereinafter, sometimes referred to as a target image), to which surface effect is applied out of various images stored in the storage unit 12 (for example, photographs, characters, graphics, and images combined with the foregoing). The method of inputting the image specifying information is not limited to this and is discretionary.

The display control unit 121 controls the display of various types of information on the display unit 14. In the first embodiment, when the input control unit 124 receives the image specifying information, the display control unit 121 reads out the image specified by the image specifying information from the storage unit 12 and controls the display unit 14 to display the image read out on a screen.

The user can operate the input unit 13, while checking a target image displayed on the display unit 14, to input specifying information that specifies a glossy area to which a surface effect, is applied and the type of the surface effect. The method of inputting the specifying information is not limited to this and is discretionary.

Figure 7:
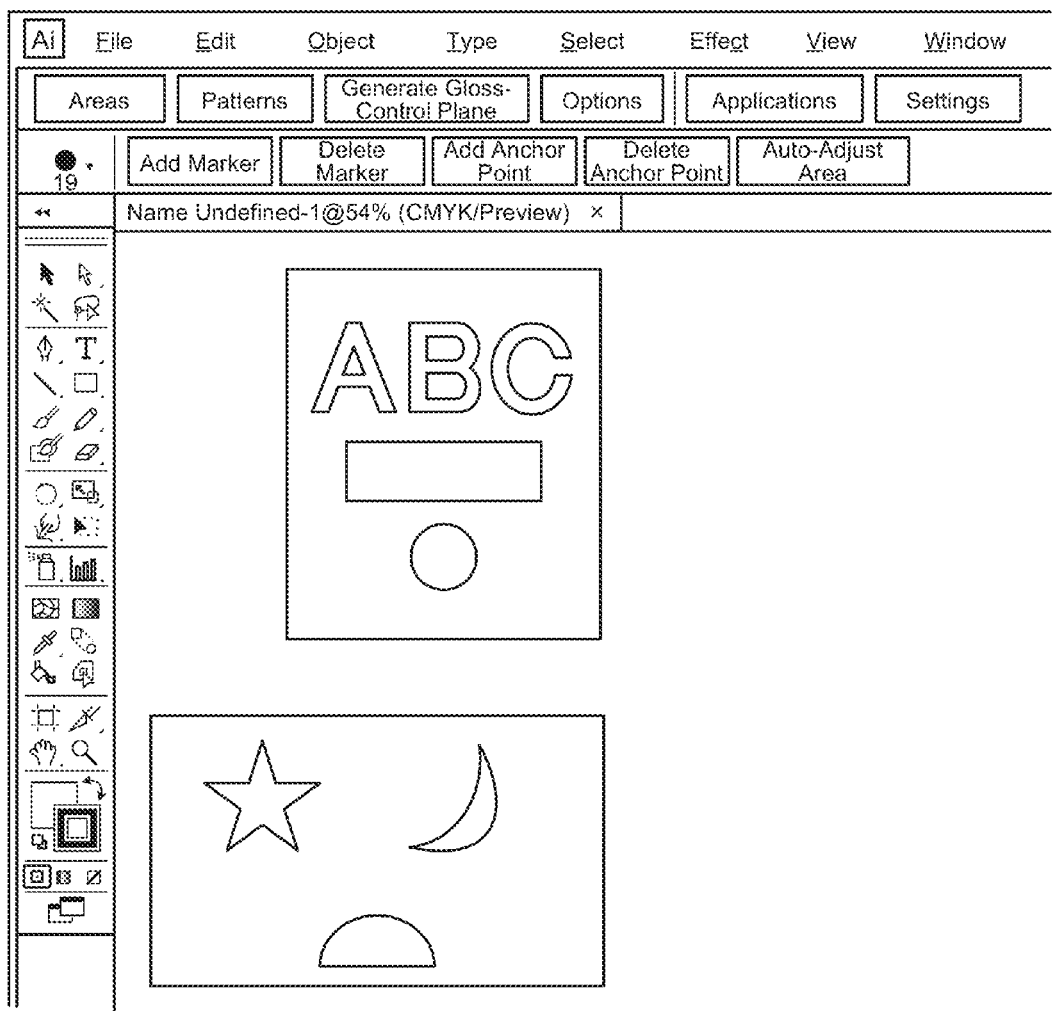
FIG. 7 is a diagram illustrating an example of a screen displayed.
Figure 8:
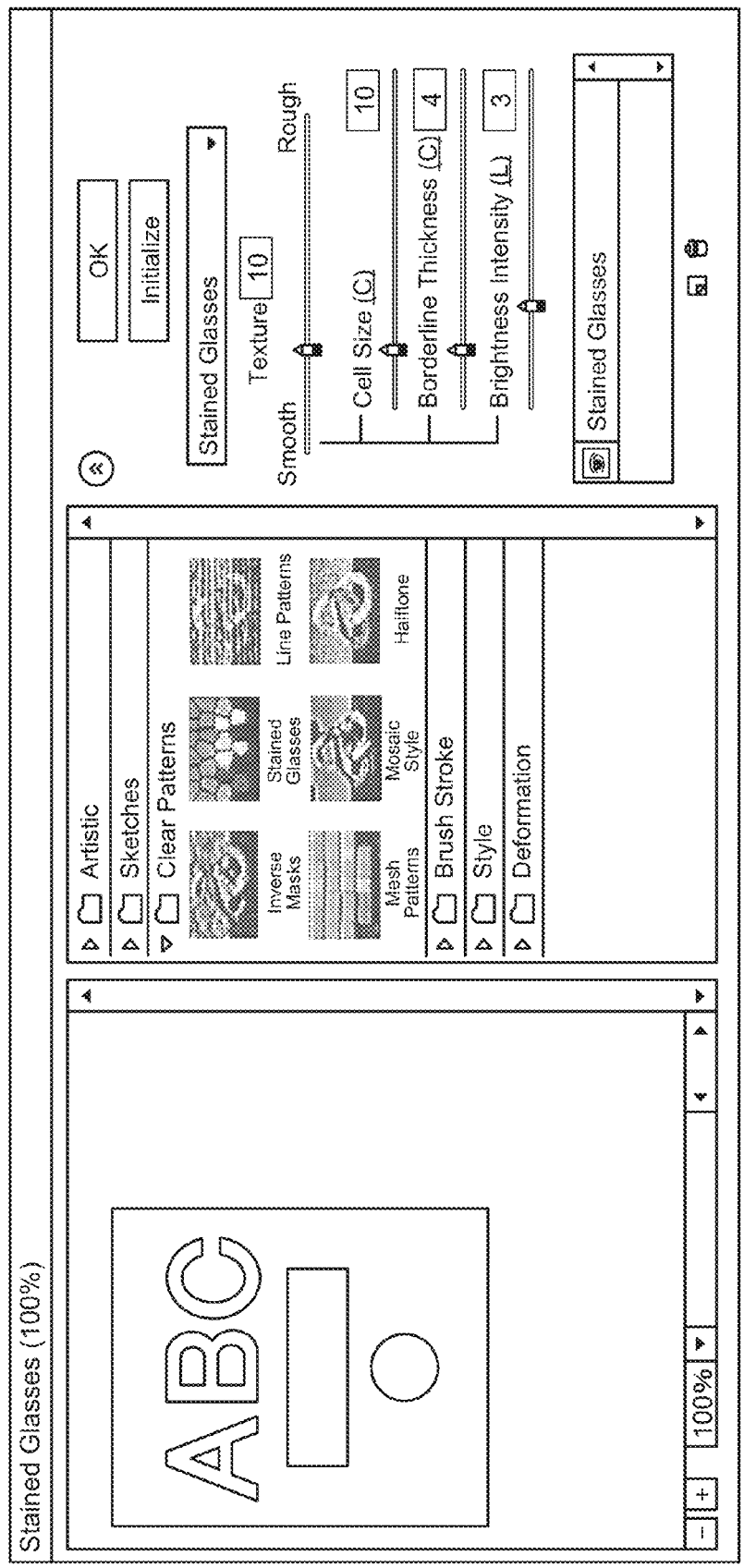
FIG. 8 is a diagram illustrating an example of a screen displayed.

More specifically, the display control unit 121 makes the display unit 14 display, for example, a screen illustrated in FIG. 7. FIG. 7 is an example of a screen displayed when a plug-in is installed to Illustrator® marketed by Adobe Systems Inc. On the screen illustrated in FIG. 7, an image represented by target image data (first color plane image data) that is the subject of processing is displayed. The user presses an add marker button and then performs an input operation to specify a glossy area to add a surface effect via the input unit 13 so as to specify the glossy area to which the surface effect is applied. The user is expected to perform such operation on all glossy areas to apply a surface effect. The display control unit 121 then makes the display unit 14, for example, display a screen illustrated in FIG. 8 for each of the glossy areas (drawing areas) specified. On the screen illustrated in FIG. 8, displayed is an image indicative of a drawing area of a glossy area for each of the glossy areas (drawing areas) specified to apply a surface effect. By performing an input operation to specify the type of the surface effect to be applied to the image (drawing area) via the input unit 13, the type of the surface effect to add to the area is specified.

Referring back to FIG. 2, the image processing unit 120 performs various types of image processing to a target image based on the instructions by the user via the input unit 13.

When the input control unit 124 receives the specifying information (a glossy area to which a surface effect is applied and the type of the surface effect), the plane data generating unit 122 generates the first gloss-control plane image data based on the specifying information. Furthermore, when the input control unit 124 receives specification for a transparent image, the plane data generating unit 122 generates the first clear plane image data according to the specification by the user.

The storage unit 12 stores therein a density value selection table in which the types of surface effects and density values corresponding to the types of surface effects are stored. FIG. 9 is a chart illustrating an example of the density value selection table. In the example in FIG. 9, the density values corresponding to "PG" (mirror-surface glossy) are from 94% to 98%. The density values corresponding to "G" (solid glossy) are from 84% to 90%. The density values corresponding to "M" (halftone matte) are from 10% to 16% and the density values corresponding to "PM" (delustered) are from 2% to 6%. The types of surface effects may be further divided to set. More specifically, for example, as illustrated in FIG. 9, "PG" (mirror-surface glossy) may be further divided into three types of type A to type C, and the density values corresponding to the type A to the type C may be defined as 98%, 96%, and 94%, respectively. The density values corresponding to "G" (solid glossy) may be further divided into type 1 to type 4, and the density values corresponding to the type 1 to the type 4 may be defined as 90%, 88%, 86%, and 84%, respectively. Similarly, "M" (halftone matte) may be further divided into type 1 to type 4, and the density values corresponding to the type 1 to the type 4 may be defined as 10%, 12%, 14%, and 16%, respectively. Likewise, "PM" (delustered) may be divided into three types of type A to type C, and the density values corresponding to the type A to the type C may be defined as 2%, 4%, and 6%, respectively.

Returning to FIG. 2, the plane data generating unit 122 sets the density value of the drawing area where a given surface effect is specified by the user to the value corresponding to the type of the surface effect, while referring to the density value selection table illustrated in FIG. 9, to generate the first gloss-control plane image data. The first gloss-control plane image data generated by the plane data generating unit 122 is the data in vector format expressed as a set of coordinates of points, parameters of equations for lines or planes connecting the points, and drawing areas indicative of fills, special effects, and others.

The plane data generating unit 122 generates document data in which the above-described first gloss-control plane image data, the first color plane image data, and the first clear plane image data are combined, and outputs the document data to the print data generating unit 123.

The print data generating unit 123 generates print data based on the document data received. The print data is configured to include the document data and job commands that specify settings to a printer. The job commands include, for example, setting of a printer, setting for aggregate printing, and setting for duplex printing. The print data may be converted into a page description language (PDL) such as PostScript, or may be in PDF format, as is if the DFE 30 supports it.

Referring back to FIG. 1, the DFE 30 will be explained next.

The DFE 30 generates image data to form toner images corresponding to the respective toners of CMYK and a colorless (transparent color) clear toner. The DFE 30 then transmits the image data generated to each of a printer device 50 and a post processor 75 via the MIC 40.

Figure 10:
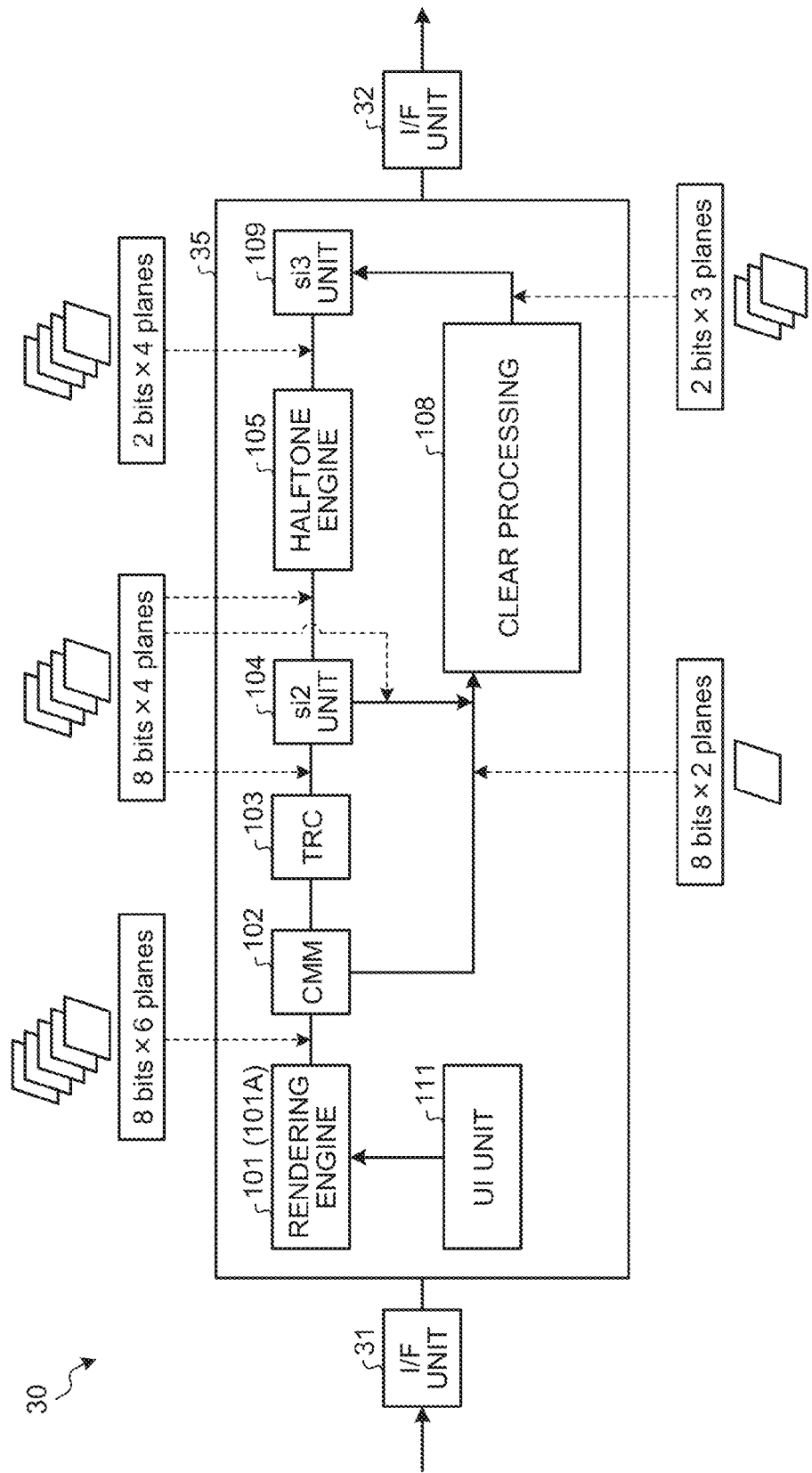
FIG. 10 is a block diagram illustrating a configuration example of a DFE according to a first embodiment.

FIG. 10 is a block diagram schematically illustrating a configuration example of the DFE 30. As illustrated in FIG. 10, the DFE 30 is configured to include an I/F unit 31, an I/F unit 32, and an image processing unit 35. The I/F unit 31 is an interface device to perform communication with the host device 10. The I/F unit 32 is an interlace device to perform communication with the MIC 40.

The image processing unit 35 is a unit to control the whole DFE 30, and is a computer configured to include a CPU, a ROM, a RAM, and others. As illustrated in FIG. 10, examples of the functions of the image processing unit 35 include a rendering engine 101, a user interface (UI) unit 111 that displays various types of information and receives various instructions, a color management module (CMM) 102, a tone reproduction curve (TRC) 103, an si2 unit 104, a halftone engine 105, a clear processing 108, and an si3 unit 109. The functions of the foregoing are realized by the CPU of the image processing unit 35 loading various programs stored in the ROM and such onto the RAM and executing the programs. It is also possible to realize at least a part of the functions by an individual circuit (hardware). A surface effect selection table is stored, for example, in an auxiliary storage unit.

The rendering engine 101 receives print data from the host device 10. The rendering engine 101 performs language interpretation of document data included in the print data received, and performs rasterization process in which a vector format is converted into a raster format.

By the rasterization process, the first color plane image data that represents a color image in vector format for each drawing area included in the document data is converted into second color plane image data in a so-called raster format that defines a density value of the color image for each pixel. The first gloss-control plane image data that represents the type of a surface effect and a glossy area to which the surface effect is applied in vector format for each drawing area is converted into second gloss-control plane image data in a so-called raster format that defines a density value corresponding to the type of a surface effect for each pixel. The first clear plane image data that represents a clear toner area such as a watermark in vector format for each drawing area is converted into second clear plane image data in a so-called raster format that defines a density value of a clear plane for each pixel.

The rendering engine 101 then feeds the second color plane image data, the second gloss-control plane image data, and the second clear plane image data obtained by the rasterization process to the CMM 102. The CMM 102 converts the image data expressed in an RGB color space or the like into image data that, can be processed by the printer device 50, for example, being expressed in a CMYK color space, and outputs the image data to the TRC 103.

Specifically, the CMM 102 converts the color space expressed in RGB format or the like into a color space in CMYK format, and then outputs the image data for color planes in CMYK (second color plane image data), the image data for a gloss-control plane (second gloss-control plane image data), and the image data for a clear plane (second clear plane image data) to the clear processing 108.

The TRC 103 receives the second color plane image data in CMYK via the CMM 102. The TRC 103 performs gamma correction on the second color plane image data received with a gamma curve of one-dimensional lookup table (1D_LUT) generated by calibration. Although the image processing includes total volume control of toner and such other than the gamma correction, they are omitted in the example of the first embodiment. The si2 unit 104 outputs the second color plane image data of, for example, eight bits in CMYK that is gamma corrected by the TRC 103 to the clear processing 108 as the data to generate an inverse mask. The halftone engine 105 receives the second color plane image data in CMYK after the gamma correction via the si2 unit 104. The halftone engine 105 performs halftone process on the second color plane image data in CMYK of eight bits each received, and produces third color plane image data of, for example, two bits each. The halftone engine 105 then outputs the third color plane image data in CMYK of two bits each (2 bits×4 planes) after the halftone process to the si3 unit 109. The number of bits two is merely an example and is not limited to this.

The clear processing 108 refers to the surface effect selection table that corresponds to surface information and device configuration to determine a glosser 70 to be on or off, and generates image data for a clear toner plane to adhere clear toner using the second gloss-control plane image data and the second clear plane image data. The specific content thereof is described hereinafter.

The surface effect selection table stores therein density values of image data for gloss-control plane that are expressed in a range of 0% to 98%, density values of image data for gloss-control plane that are expressed in 256 steps of 0 to 255, types of surface effects, on-off information that specifies the glosser 70 to be either on or off, methods of determining density values of image data for clear toner planes, and types of practicable surface effect being linked with one another. The surface effect selection table is defined being linked with the information of device configuration and the information indicative of the glosser 70 to be on or off.

FIG. 11 is a chart illustrating an example of the surface effect selection table. The content of the surface effect, selection table is determined according to the device configuration information and priority information. The device configuration information is the information indicative of a configuration of the post processor 75 (described later in detail) installed in the printing apparatus 60. The priority information is the information indicative of either of gloss priority or type priority. The term gloss priority means to indicate that, the surface effect is replaced with a surface effect of a higher glossiness. The term type priority means to indicate that the surface effect is replaced with a surface effect, excluding "PG" (mirror-surface glossy) of the highest glossiness.

The clear processing 108 reads out the surface effect, selection table corresponding to the device configuration information and the priority information from a storage unit, omitted to illustrate. For example, the clear processing 108 reads out the surface effect selection table illustrated in FIG. 11. The priority information is the information indicative of gloss priority or type priority, and is specified by, for example, the operation of the user. The device configuration information is the information indicative of the types of the post-processor 75 provided on the printing apparatus 60.

When the priority information indicates gloss priority, the clear processing 108 then determines the glosser 70 to be on. When the priority information indicates type priority, the clear processing 108 then determines the glosser 70 to be off.

The clear processing 108 then converts, for example, the pixel data of eight bits into the pixel data of two bits for the pixel at each pixel position. In more detail, when both a transparent image and an area to which surface effect is added overlap for a pixel that is the subject of conversion process, the clear processing 108 excludes either one of them in unit of pixel according to the priority setting set in advance.

Specifically, for example, when the priority setting indicates clear plane priority, the clear processing 108 converts 8-bit pixel data for a clear plane into 2-bit pixel data. When the priority setting indicates gloss-control priority, the clear processing 108 converts 8-bit pixel data for a gloss-control plane into 2-bit pixel data.

The clear processing 108 then, using the surface effect, selection table corresponding to the on- or off-state of the glosser 70 and the device configuration information determined in response to the priority information, generates 2-bit image data Clr-1 for a first clear toner plane, 2-bit image data Clr-2 for a second clear toner plane, and 2-bit image data Clr-3 for a third clear toner plane from the second gloss-control plane image data or the second clear plane image data.

The first clear toner plane image data Clr-1 is image data used when the printer device 50 makes prints using clear toner. The second clear toner plane image data Clr-2 is image data used when a normal fixing post-processing device 80 makes prints using clear toner. The third clear toner plane image data Clr-3 is image data used when a low temperature fixing post-processing device 90 makes prints using clear toner.

The clear processing 108 then outputs on-off instruction information that instructs the glosser 70 to be either on or off and the image data for clear toner planes of two bits each (Clr-1 to Clr-3) to the si3 unit 109.

In the example in FIG. 11, when the density value of a pixel included in the second gloss-control plane image data is 238 to 255 (94% to 98%), the type of the surface effect corresponding to the density value of the pixel is "PG" (mirror-surface glossy). The on-off information is on. When in "PG", the clear image data input to the first clear toner plane image data Clr-1 is an inverse mask 1. When the surface effect, is "PG", the clear image data input, to the second clear toner plane image data Clr-2 and to the third clear toner plane image data Clr-3 is no data (no clear image data).

Likewise, when the density value of a pixel included in the second gloss-control plane image data is 212 to 232 (84% to 90%), the type of the surface effect corresponding to the density value of the pixel is "G" (solid glossy). The on-off information is on. When in "G", the clear image data input to the first clear toner plane image data Clr-1 is an inverse mask m. When the surface effect is "G", the clear image data input to the second clear toner plane image data Clr-2 is solid, and the clear image data input to the third clear toner plane image data Clr-3 is no data (no clear image data).

Similarly, when the density value of a pixel included in the second gloss-control plane image data is 23 to 43 (10% to 16%), the type of the surface effect corresponding to the density value of the pixel is "M" (halftone matte). The on-off information is on. When in "M", the clear image data input to the first clear toner plane image data Clr-1 and to the third clear toner plane image data Clr-3 is no data (no clear image data).

When the surface effect is "M", the clear image data input to the second clear toner plane image data Clr-2 is halftone-n.

When the density value of a pixel included in the second gloss-control plane image data is 1 to 17 (0% to 6%), the type of the surface effect corresponding to the density value of the pixel is "PM" (delustered). The on-off information is on. When in "PM", the clear image data input to the first clear toner plane image data Clr-1 and to the second clear toner plane image data Clr-2 is no data (no clear image data).

When the surface effect is "PM", the clear image data input to the third clear toner plane image data Clr-3 is solid.

The above-described inverse mask makes a total adhesion amount of CMYK toners and a clear toner uniform on each pixel constituting a target area to which a surface effect is to be applied. Specifically, in image data for CMYK planes, all density values of the pixels constituting a target, area are added, and the image data obtained by subtracting the added value from a given value becomes an inverse mask. Specifically, it can de expressed, for example, by the following Equation (1).

$$Clr = 100 - (C + M + Y + K) \tag{1}$$

However, when Clr becomes Clr<0, Clr is Clr=0.

In Equation (1), Clr, C, M, Y, and K represent, for the clear toner and the respective toners of C, M, Y, and K, a density ratio that, is converted from a density value of each pixel. In other words, by Equation (1), the total adhesion amount, which is a total adhesion amount of the respective toners of C, M, Y, and K added with an adhesion amount of the clear toner, is made to be 100 percent for all the pixels constituting the target area to add a surface effect. When the total adhesion amount of respective toners of C, M, Y, and K is 100 percent or higher, the clear toner does not adhere and its density ratio is made to zero percent. This is because a portion where the total adhesion amount of respective toners of C, M, Y, and K is higher than 100 percent is smoothed out by fixing process. As in the foregoing, the total adhesion amounts on all of the pixels constituting the target area to which a surface effect is to be applied are made to be 100 percent or higher, thereby eliminating irregularities of the surface by the difference in total adhesion amount in the target area, whereby the gloss by regular reflection of light, is produced as a result. However, the inverse mask can be obtained by other than Equation (1), and there can be a plurality of inverse mask types. Later described INV-1 and INV-m correspond to those.

A solid mask makes the clear toner adhere evenly on each pixel constituting a target area to which a surface effect is to be applied. Specifically, it is expressed, for example, by the following Equation (2).

$$Clr=100 \qquad (2)$$

There may be pixels corresponding to a density ratio of other than 100 percent out of target pixels to add a surface effect, and there can be a plurality of solid mask patterns present.

Furthermore, for example, the inverse mask may be obtained by multiplication of a background exposure rate of each color. The inverse mask in this case is expressed, for example, by the following Equation (3).

$$Clr=100 \times \{(100-C)/100\} \times \{(100-M)/100\} \times \{(100-Y)/100\} \times \{(100-K)/100\} \qquad (3)$$

In the above-described Equation (3), $(100-C)/100$ indicates the background exposure rate of C, $(100-M)/100$ indicates the background exposure rate of M, $(100-Y)/100$ indicates the background exposure rate of Y, and $(100-K)/100$ indicates the background exposure rate of K.

Moreover, for example, the inverse mask may be obtained by a method that assumes a dot of maximum area ratio controls smoothness. The inverse mask in this case is expressed, for example, by the following Equation (4).

$$Clr=100-\max(C,M,Y,K) \qquad (4)$$

In the above-described Equation (4), max(C, M, Y, and K) means to indicate that a density value of the color that indicates a maximum density value out of CMYK becomes a representative value.

In short, the inverse mask is only necessary to be the one expressed by any of the above-described Equations (1) to (4).

In the example in FIG. 11, it is indicated that, when the density value of a pixel included in the second gloss-control plane image data is 212 to 232 (84% to 90%), the type of the surface effect corresponding to the density value of the pixel is "G" (solid glossy), the on-off information is on, the density value of the pixel in the first clear toner plane image data Clr-1 is obtained by inverse mask m and is expressed in eight bits, the density value of the pixel in the second clear toner plane image data Clr-2 is obtained by solid and is expressed in two bits, the density value of the pixel in the third clear toner plane image data is none (no data), and the type of feasible surface effect is "G". The inverse mask m is expressed by an equation different from the above-described Equation (1) (any one of Equations (2) to (4)). This is because the total adhesion amount of toner that is smoothed out is different from that for "PG" (mirror-surface glossy). The solid makes clear toner evenly adhere on each pixel constituting the target area to add a surface effect. Specifically, it is expressed, for example, by the above-described Equation (2). There may be pixels corresponding to a density ratio of other than 100% out of target pixels to which a surface effect is to be applied, and there can be a plurality of solid patterns present.

Furthermore, in the example in FIG. 11, it is indicated that, when the density value of a pixel included in the second gloss-control plane image data is 23 to 43 (10% to 16%), the type of the surface effect corresponding to the density value of the pixel is "M" (halftone matte), the on-off information is on, the density value of the pixel in the first clear toner plane image data Clr-1 is no data, the density value of the pixel in the second clear toner plane image data Clr-2 is obtained by halftone-n and is expressed in two bits, the density value of the pixel in the third clear toner plane image data is no data, and the type of practicable surface effect is "M". The halftone-n lowers a glossiness by performing a halftone process on clear toner so as to add irregularities on the surface to cause irregular reflection. There are a number of halftone processes, and the halftone-n is stated as an expression to indicate one of them. In the first embodiment, when "M" (halftone matte) is specified as the type of a surface effect, the density value of each pixel within the area where "M" is specified in the gloss-control plane image data is commonly set to any value in a range of 23 to 43.

In the example in FIG. 11, it is indicated that, when the density value of a pixel included in the second gloss-control plane image data is 1 to 17 (0% to 6%), the type of the surface effect corresponding to the density value of the pixel is "PM" (delustered), the on-off information is on, the density value of the pixel in the first clear toner plane image data Clr-1 and the second clear toner plane image data Clr-2 is no data, the density value of the pixel in the third clear toner plane image data is obtained by solid and is expressed in two bits, and the type of practicable surface effect, is "PM".

In the first embodiment, the clear processing 108 refers to the surface effect selection table in FIG. 11 depending on gloss priority or type priority to determine the glosser 70 to be on or off. The clear processing 108, using the on- or off-sate of the glosser 70 determined and the surface effect, selection table that corresponds to the on/off state of the glosser 70 and the device configuration, further generates 8-bit image data Clr-1 for the first clear toner plane, 2-bit image data Clr-2 for the second clear toner plane, and 2-bit image data Clr-3 for the third clear toner plane using the second gloss-control plane image data, received. The clear processing 108 further performs halftone process on the 8-bit image data Clr-1 for the first clear toner plane to convert it into 2-bit image data Clr-1 for the first clear toner plane. The clear processing 108 then outputs the on-off instruction information that instructs the glosser 70 to be either on or off and the 2-bit image data for the clear toner planes (Clr-1 to Clr-3) to the si3 unit 109.

The si3 unit 109 integrates the third color plane image data that is the respective 2-bit image data of CMYK after the halftone process (2 bits×4 planes) and the 2-bit image data for clear toner planes (Clr-1 to Clr-3) generated by the clear processing 108 (2 bits×3 planes), outputs the integrated image data to the MIC 40, and further outputs the on-off instruction information fed from the clear processing 108 to the MIC 40.

The MIC 40 is connected to the DFE 30 and the printer device 50, receives the third color plane image data and the clear toner plane image data, from the DFE 30, distributes the respective image data to the corresponding devices, and controls the post processors. In the first embodiment, for example, when each of "PG", "G", "M", and "PM" is specified on a single page, the image data for seven planes of two bits each (CMYK+Clr-1+Clr-2+Clr-3) and the on-off instruction information instructing the glosser 70 to be on are output from the DFE 30 to the printing apparatus 60 via the MIC 40.

Figure 12:
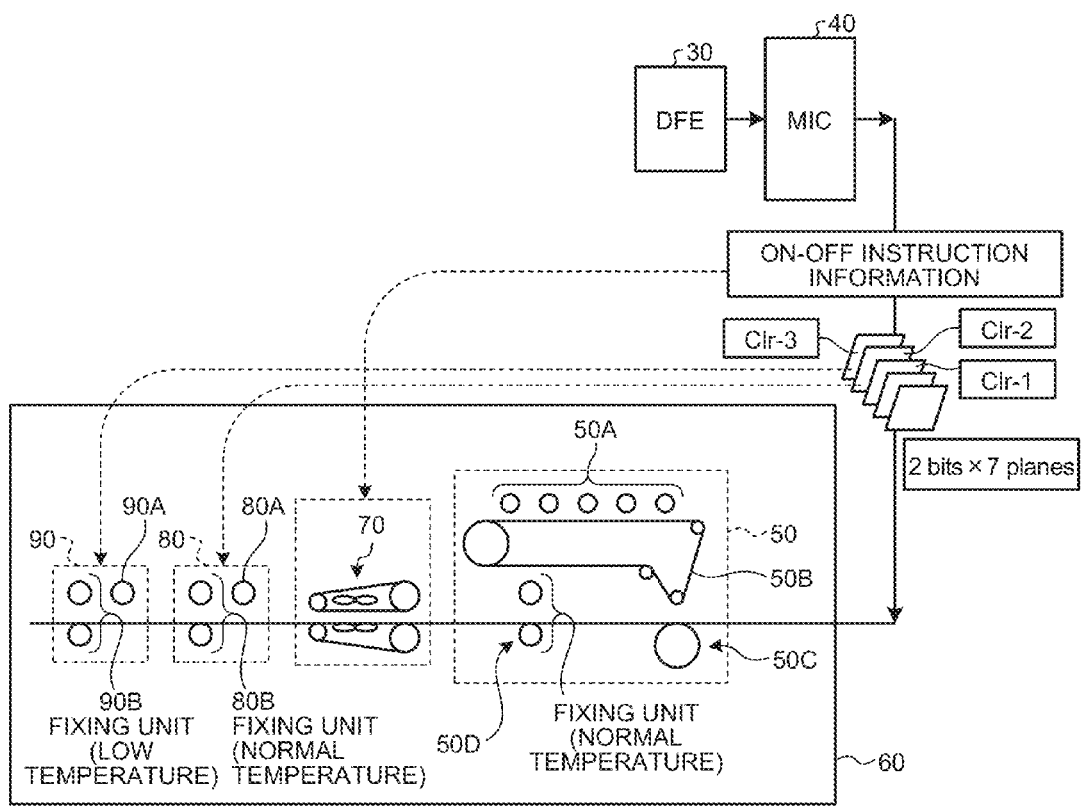
FIG. 12 is a schematic diagram illustrating a printer device and a post-processor.

FIG. 12 is a schematic diagram illustrating the printing apparatus 60. As illustrated in FIG. 12, in the first embodiment, the printing apparatus 60 includes the printer device 50 and the post processors 75 (also see FIG. 1). The post processors 75 includes, in the first embodiment, the normal fixing post-processing device 80 and the low temperature fixing post-processing device 90.

In the printer device 50, loaded are at least respective toners of CMYK and a clear toner, and for each toner, mounted are an image forming unit that includes a photosensitive element, a charging unit, a developing unit, and a photosensitive-element cleaner, an exposing unit, and others.

In this case, in more detail, as illustrated in FIG. 12, the DFE 80 outputs, via the MIC 40, the third color plane image data in CMYK (2 bits×4 planes) and the image data Clr-1 for first clear toner plane to the printer device 50. The DFE 30 further outputs, via the MIC 40, the on-off instruction information indicative of on to the glosser 70. In response to this, the glosser 70 transits to the on state. Moreover, the DFE 30 outputs, via the MIC 40, the image data Clr-2 for second clear toner plane to the normal fixing post-processing device 80 and the image data Clr-3 for third clear toner plane to the low temperature fixing post-processing device 90.

In the example in FIG. 12, the printer device 50 forms toner images corresponding to the respective toners on the photosensitive elements by irradiating them with light beams from the exposing units using the third color plane image data in CMYK (2 bits×4 planes) and the image data Clr-1 for first clear toner plane output from the MIC 40, and fixes the toner images after transferring them onto a recording medium.

The printer device 50 includes a plurality of electrophotographic photosensitive elements 50A, a transfer belt SOB on which the toner images formed on the photosensitive elements 50A are transferred, a transferring device 50C that transfers the toner images on the transfer belt. SOB onto a recording medium, and a fixing device SOD that fixes the toner images on the recording medium to the recording medium. The photosensitive elements 50A are composed of photosensitive elements that form toner images in respective colors of CMYK and a photosensitive element that forms a clear toner image. Using the image data for third color planes in CMYK and the image data Clr-1 for first clear toner plane output from the MIC 40, toner images corresponding to the respective toners are formed on the photosensitive elements by irradiating them with the light beams from the exposing units, and the toner images are transferred onto a recording medium and then fixed thereon. Consequently, an image is formed on the recording medium by the clear toner besides the toners in CMYK adhering thereon.

The glosser 70 is controlled to be on or off by the DFE 30, and when controlled to be on, the glosser 70 re-fixes the image formed on the recording medium by the printer device 50. As a result, the total adhesion amount of toner for each pixel on which toner of a given amount or more adheres is compressed to be even for the whole image formed on the recording medium.

The normal fixing post-processing device 80 includes an image forming unit including a photosensitive element for clear toner 80A, a charging unit, a developing unit, and a photosensitive-element cleaner, an exposing unit, and a fixing unit SOB for fixing the clear toner. The normal fixing post-processing device 80, for example, forms a toner image with clear toner using the image data Clr-2 for second clear toner plane output from the MIC 40, places the toner image over on the recording medium that passed the glosser 70, and applies heat and pressure at normal temperature to fix the toner image on the recording medium.

The low temperature fixing post-processing device 90 includes an image forming unit including a photosensitive element for clear toner 90A, a charger, a developing unit, and a photosensitive-element cleaner, an exposing unit, and a fixing unit 90B for fixing the clear toner. The low temperature fixing post-processing device 90, for example, forms a toner image with clear toner using the image data Clr-3 for third clear toner plane output from the MIC 40, places the toner image over on the recording medium that, passed the normal fixing post-processing device 80, and applies heat and pressure at low temperature to fix the toner image on the recording medium.

The recording medium, after being processed in sequence by these devices and thus an image is formed and surface effect is applied, is conveyed by a conveying mechanism omitted to illustrate and discharged to the outside of the printing apparatus 60.

In the above-described manner, a transparent image using clear toner is formed on the recording medium. In the area where "PG" (mirror-surface glossy) is specified by the user, an effect as "PG" is realized, and in the area where "G" (solid glossy) is specified by the user, an effect as "G" is realized. Furthermore, in the area where "M" (halftone matte) is specified by the user, an effect as "M" is realized, and in the area where "PM" (delustered) is specified by the user, an effect as "PM" is realized. More specifically, in the device configuration mounted with the glosser 70, the normal fixing post-processing device 80, and the low temperature fixing post-processing device 90, as the post-processor 75, the surface effect of all four types of "PG" (mirror-surface glossy), "G" (solid glossy), "M" (halftone matte), and "PM" (delustered) can be realized. In an area to which the surface effect is not specified to be added, none of the surface effect, is added.

Detailed Description of Rendering Engine 101

It is known that a jagged and step-like portion (referred to as alias) appears when a printing apparatus or the like outputs an end portion of a graphic image or a character image and prints a diagonal line image. As a process to smooth out the alias portion, an anti-aliasing process that, performs density correction on each pixel at the time of rasterization is known.

Figure 13A:
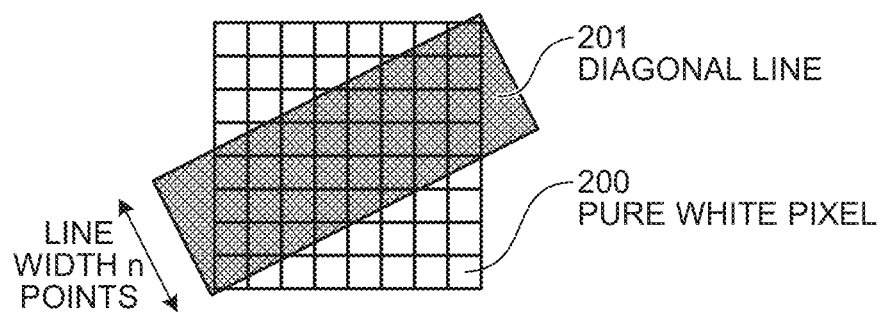
FIG. 13A is a schematic diagram illustrating a diagonal line that is a subject of anti-aliasing.

Specifically, for example, as illustrated in FIG. 13A, a situation of converting an image in vector format that represents a diagonal line 201 with a line width of n points into raster format composed of a plurality of pixel data, will be explained. In this case, when an anti-aliasing process is not performed, the diagonal line 201 as a drawing area in vector format is subjected to a scan-line process and is converted into raster format that indicates a density value for each pixel. In more detail, in the scan-line process, when an area ratio of a drawing area before rasterization in vector format in each pixel after the rasterization is larger than a given value (for example, 50 percent or higher), the density value of the drawing area in vector format is used as the density value of the pixel (see pixel 204 in FIG. 13B). Meanwhile, when the area ratio of a drawing area before rasterization in vector format in each pixel is under a given value (for example, under 50 percent), the density value of the pixel is determined to be zero (see pure white pixel 200 in FIG. 13B).

Figure 13B:
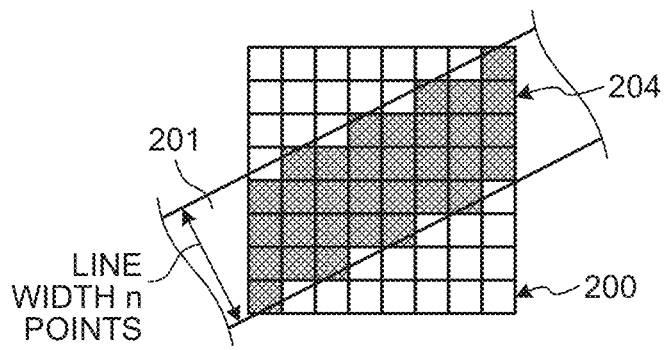
FIG. 13B is a schematic diagram illustrating pixel data rasterized without an anti-aliasing process being performed.

Accordingly, as illustrated in FIG. 13B, in the image of the diagonal line 201 that is a drawing area composed of a plurality of pixel data obtained by the rasterization process, a step-like alias is produced along the contour portion of the diagonal line 201.

Therefore, conventionally, it is known that, as a process to smooth out the alias portion, an anti-aliasing process that performs density correction on each pixel is performed at the time of rasterization.

Specifically, when performing an anti-aliasing process conventionally, the area ratio of a drawing area before rasterization in vector format in each pixel is calculated. As for the density value of each pixel, used is a density value obtained by multiplying the density value indicated by the drawing area in vector format by the area ratio calculated.

In the first embodiment, the density value is explained as a value to indicate density or brightness.

Figure 13C:
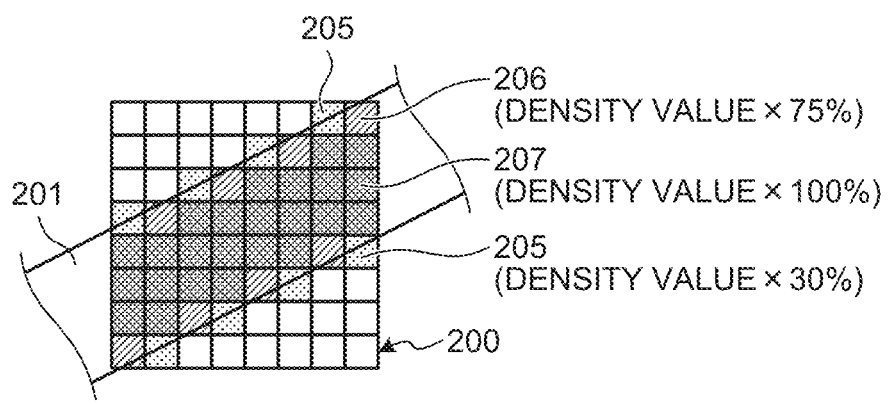
FIG. 13C is a schematic diagram illustrating pixel data after an anti-aliasing process is performed.

In FIG. 13C, illustrated is a situation where the area ratios of a drawing area before rasterization in vector format in each pixel are present in three kinds of 100%, 75%, and 30%. For example, the diagonal line 201 that is a drawing area is assumed to be a diagonal line image in red. In this case, for the pixel of the 100% area ratio, the density value of the diagonal line 201 is used as is (more specifically, multiplied by an area ratio of 100%), and the density value of (C, M, Y, K)=(0, 255, 255, 0) is used as the density value of the pixel (see pixel 207 in FIG. 13C). Similarly, for the pixel of the 75% area ratio, the density value of the diagonal line 201 is multiplied by an area ratio of 75%, and the density value of (C, M, Y, K)=(0, 191, 191, 0) is used as the density value of the pixel (see pixel 206 in FIG. 13C). Likewise, for the pixel data of the 30% area ratio, the density value of the diagonal line 201 is multiplied by an area ratio of 30%, and the density value of (C, M, Y, K)=(0, 77, 77, 0) is used as the density value of the pixel (see pixel 205 in FIG. 13C).

Accordingly, as illustrated in FIG. 13C, the density value is corrected to be smaller as the area ratio is lowered, whereby the alias is reduced.

However, as in the foregoing, the density value of each of the drawing areas (glossy areas) specified by the first gloss-control plane image data included in the document data is the density value corresponding to the type of a surface effect.

Therefore, when the above-described conventional anti-aliasing process is performed to achieve the reduction of alias, what appears is an area to which the type of a surface effect different from the type of the surface effect specified by the user is applied.

Accordingly, when it is configured such that an anti-aliasing process is performed on the first color plane image data at the time of rasterization and the anti-aliasing process is not performed on the first gloss-control plane image data at the time of rasterization, it can be suppressed that a surface effect different from the type of the surface effect specified is applied. However, when such a process is performed, in the area where the drawing area specified by the first gloss-control plane image data and the drawing area specified by the first color plane image data overlap, the shapes of end portions of these drawing areas may disagree.

Consequently, in the image processing unit 35 in the first embodiment, the rendering engine 101 that performs rasterization process performs the following specific process.

The rendering engine 101 of the image processing unit 35 in the first embodiment, will be described in detail in the following.

FIG. 14 illustrates a functional block diagram of the rendering engine 101.

The rendering engine 101 is electrically connected to the UI unit 111. The UI unit 111 is an input device operated by the user when various operational instructions are given. The UI unit 111 includes, for example, buttons, a remote control unit receiver, and a card reader that reads information from an IC card and such. The UI unit 111 may be configured to include a keyboard. In the first embodiment, the UI unit 111 is operated by the user when the information indicative of the presence or absence of execution of an anti-aliasing process is entered. The UI unit 111 outputs the information indicative of the presence or absence of execution of the anti-aliasing process entered by the operation of the user to the rendering engine 101.

The rendering engine 101 includes a document data, reading unit 300, an analyzing unit 302, an object, structure list storage unit 304, an anti-aliasing determining unit 306, a color space information acquiring unit 308, and an anti-aliasing processing unit 309.

The document data reading unit 300 receives print data from the host device 10 and reads out document data included in the print data. In more detail, the document data reading unit 300 loads the document data in a primary memory omitted to illustrate by referring to a file extension or a file header of the document data to make it possible to be handled.

The analyzing unit 302 analyzes data structure of the document data loaded and creates an object structure list that indicates a list of drawing areas (hereinafter, sometimes referred to as an object) included in each page of the document data.

The object structure list is the information indicative of a list of drawing areas included in each page of the document data. Specifically, the analyzing unit 302 analyzes an object that is one or more of drawing areas included in each of the first color plane image data, the first gloss-control plane image data, and the first clear plane image data of the document data, and creates an object structure list that indicates drawing information (position, color space, density, and others of a drawing area) for each object.

Figure 15:
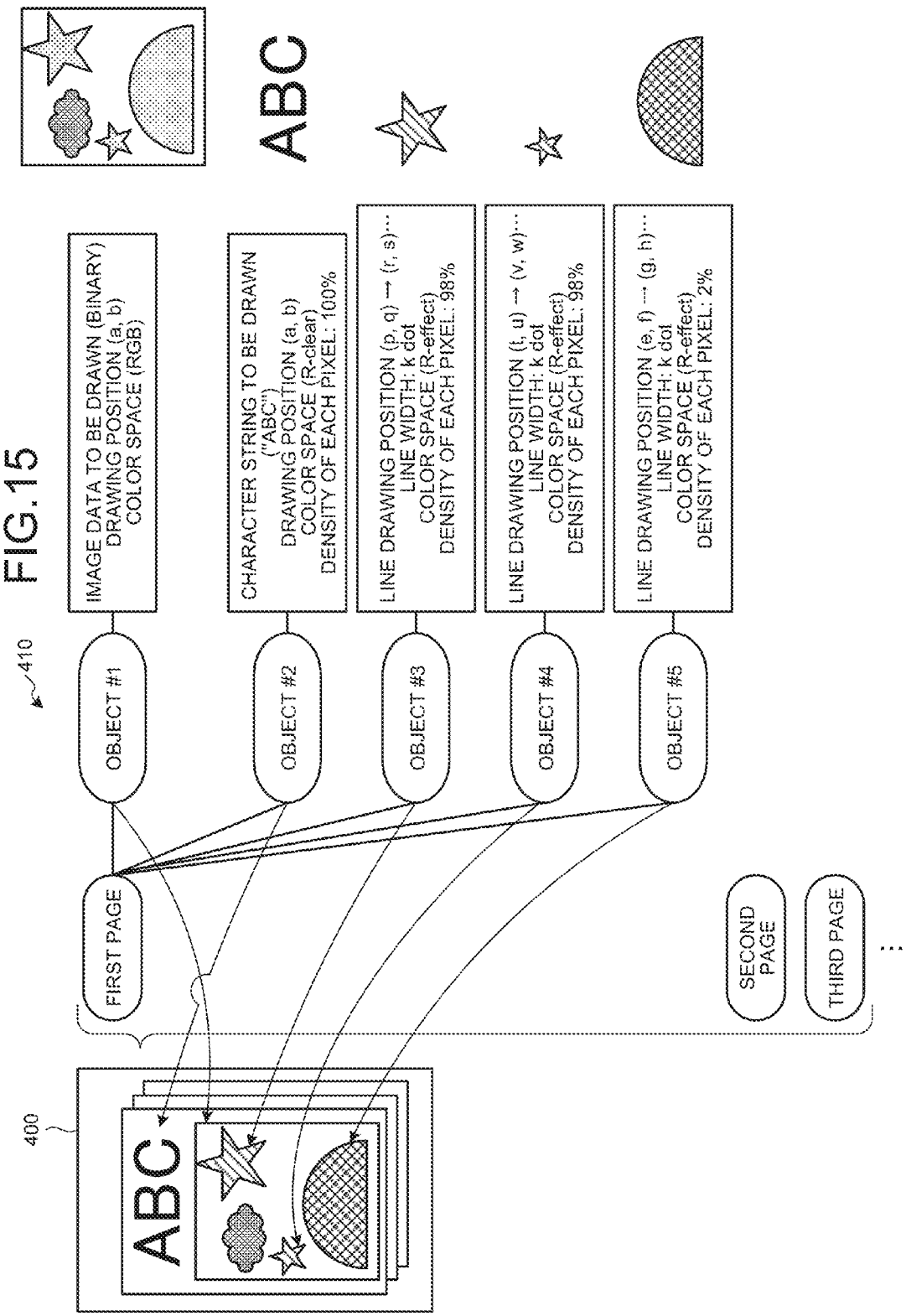
FIG. 15 is a schematic diagram illustrating an example of a configuration of document data.

FIG. 15 illustrates an example of a configuration of the document data.

The document data includes drawing information indicative of one or more of drawing areas (objects) specified by the first, color plane image data, the first gloss-control plane image data, and the first clear plane image data in one page (in the same page). In FIG. 15, illustrated as an example is a situation where the document data 400 includes, for example, five objects of object #1 to object #5 in the first page.

In the example illustrated in FIG. 15, the object #1 indicates a drawing area of a color image specified by the first color plane image data. The object #2 indicates a drawing area of a transparent image specified by the first clear plane image data. The objects #3 to #5 indicate respective drawing areas of glossy areas specified by the first gloss-control plane image data.

The document data, includes, for each object, as drawing information, the information indicative of position, color space, and density of a drawing area. The position of a drawing area is indicated, for example, by coordinate information or a set of coordinate information. The color space means to indicate each drawing area (object) being which of a color image, a transparent image, or a glossy area. In the first embodiment, in FIG. 15 and in respective drawings, a transparent image may be descried as R-clear. Furthermore, a glossy area, may be described as R-effect, and a color image may be described as RGB. A situation where a density value (0 to 100%) is set as the density of each object will be exemplified. In the example illustrated in FIG. 15, illustrated is a situation where a group of drawing areas of color images specified by the first color plane image data is regarded as a single object (drawing area).

Referring back to FIG. 14, the explanation is continued. The object structure list storage unit 304 stores therein an object structure list that is an analysis result of document data by the analyzing unit 302. The object structure list indicates objects included in a page, for example, in a tree structure (see a tree structure 410 in FIG. 15).

The anti-aliasing determining unit 306 reads out the information indicative of the presence or absence of execution of an anti-aliasing process received from the UI unit 111 to determine whether to perform an anti-aliasing process. The information indicative of the presence or absence of execution of an anti-aliasing process received from the UI unit 111 may be stored in a primary memory of the rendering engine 101 omitted to illustrate. In this case, the anti-aliasing determining unit 306 is only necessary to read out the information stored in the primary memory to determine the presence or absence of execution of an anti-aliasing process.

The color space information acquiring unit 308 reads out the information indicative of color space of each object indicated by the object structure list to acquire the information indicative of each object being which object of a color image, a glossy area, or a transparent, image.

The anti-aliasing processing unit 309 performs rasterization process on the first color plane image data, the first clear plane image data, and the first gloss-control plane image data included in document data, and performs an anti-aliasing process. In the first embodiment, the anti-aliasing processing unit 309 corrects the pixel value of each pixel in color plane image data (later descried second color plane image data) to a value multiplied by a first area, ratio of a drawing area, of the first color plane image data before rasterization in the second color plane image data. The anti-aliasing processing unit 309 further corrects the pixel value of each pixel in gloss-control plane image data (later described second gloss-control plane image data) to a value multiplied by an area ratio of 100 percent.

The anti-aliasing processing unit 309 includes a generating unit 309A, a calculating unit 309C, a correcting unit 309D, and a substituting unit 309E.

The generating unit 309A performs rasterization process on the first color plane image data that represents a color image in vector format, for each drawing area, on the first gloss-control plane image data that represents the type of a surface effect and a glossy area to add the surface effect in vector format for each drawing area, and on the first, clear plane image data that, represents a transparent image in vector format for each drawing area included in the document data. The generating unit 309A then generates, by the rasterization process of the first color plane image data, second color plane image data that defines a density value of the color image for each pixel. The generating unit 309A further generates, by the rasterization process of the first gloss-control plane image data, second gloss-control plane image data that defines a density value corresponding to the type of a surface effect for each pixel. The generating unit 309A further generates, by the rasterization process of the first clear plane image data, second clear plane image data that, defines a density value of the transparent image for each pixel.

The rasterization process is a known process, and thus its detailed explanation is omitted. More specifically, the generating unit 309A sets a density value specified for each drawing area as the density value of the pixel at a pixel position overlapping the drawing area before rasterization, and performs the rasterization.

The calculating unit 309C performs calculation of area ratio when the anti-aliasing determining unit 306 determines the execution of an anti-aliasing process. Specifically, the calculating unit 309C calculates a first area ratio of a drawing area specified by the first color plane image data in vector format in each pixel of the second color plane image data. The calculating unit 309C further calculates a fourth area ratio of a drawing area specified by the first clear plane image data in vector format in each pixel of the second clear plane image data. The calculating unit 309C further calculates a second area ratio of a drawing area specified by the first gloss-control plane image data in vector format in each pixel of the second gloss-control plane image data. For the calculation of these area ratios, a known calculation method is used.

The substituting unit 309E substitutes, when the anti-aliasing determining unit 306 determines the execution of an anti-aliasing process, the second area ratio of each pixel in the second gloss-control plane image data calculated by the calculating unit 309C with a third area ratio representing an area ratio of 100 percent.

The correcting unit 309D corrects, when the execution of the anti-aliasing process is determined by the anti-aliasing determining unit 306, a density value of each pixel in the second color plane image data to a density value that is obtained by multiplying the density value by the first area ratio calculated by the calculating unit 309C. The correcting unit 309D further corrects a density value of each pixel in the second clear plane image data to a density value that is obtained by multiplying the density value by the fourth area ratio calculated by the calculating unit 309C. Meanwhile, the correcting unit 309D corrects a density value of each pixel in the second gloss-control plane image data to a density value obtained by multiplying the density value by the area ratio of 100 percent substituted by the substituting unit 309E.

Accordingly, when an anti-aliasing process is performed, the correcting unit 309D corrects, for the second color plane image data and the second clear plane image data, a density value of each pixel to a value that is obtained by multiplying the density value by an area ratio (first, area ratio, fourth area ratio) of a drawing area in vector format in each pixel. Meanwhile, the correcting unit 309D corrects, for the second gloss-control plane image data, a density value of each pixel to a value that is obtained by multiplying the density value by the third area ratio of a 100 percent area ratio, not by the area ratio (second area ratio) of a drawing area in vector format in each pixel.

In other words, the correcting unit 309D performs, for the second color plane image data and the second clear plane image data, the correction of density value of each pixel by the following Equation (5).

$$\text{Density value after correction} = \text{Density value before correction} \times \text{Area ratio}(\%) \quad (5)$$

Meanwhile, for the second gloss-control plane image data, the correcting unit 309D performs the correction of density value of each pixel by the following Equation (6).

$$\text{Density value after correction} = \text{Density value before correction} \times 100(\%) \quad (6)$$

Consequently, for the second gloss-control plane image data, a density value before the correction (a density value of a drawing area in vector format at a position corresponding to each pixel position) is used as the density value as is, regardless of the area ratio of a drawing area before rasterization in vector format in each pixel.

Next, the image processing performed by the rendering engine 101 thus configured in the first embodiment will be explained.

Figure 16:
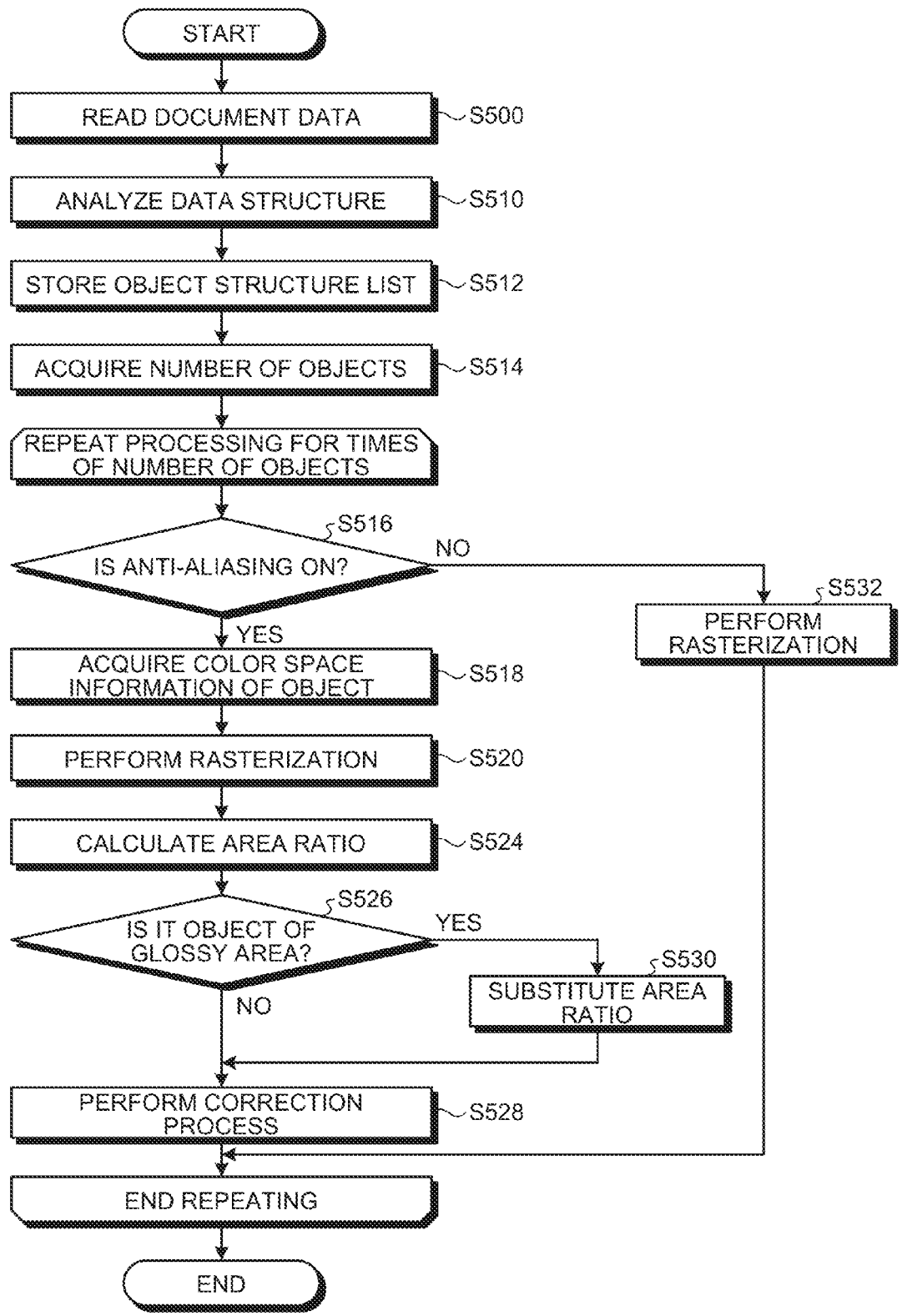
FIG. 16 is a flowchart illustrating a procedure of image processing performed by an image processing unit in the first embodiment.

FIG. 16 is a flowchart illustrating a procedure of image processing performed by the rendering engine 101 in the first embodiment.

The document data reading unit 300 first reads out document data included in print data, and loads the document data onto a primary memory omitted to illustrate (Step S500).

Next, the analyzing unit 302 analyzes the data structure of the document data loaded at Step S500 to create an object structure list (Step S510). The analyzing unit 302 then stores the object structure list that is an analysis result to a memory omitted to illustrate (Step S512).

Next, the rendering engine 101 reads out the object structure list stored in the memory and acquires the number of objects included in a single page of the document data (Step S514). The rendering engine 101 then repeats the processes at Step S516 to Step S532 for the number of objects acquired at Step S514.

The anti-aliasing determining unit 306 reads out the information indicative of the presence or absence of execution of an anti-aliasing process received from the UI unit 111, and determines whether to perform an anti-aliasing process (Step S516).

When the anti-aliasing process is determined to be performed (Yes at Step S516), the color space information acquiring unit 308 acquires the information indicative of color space of the object (color space information) (Step S518). The color space information acquiring unit 308 acquires, by acquiring the color space information, the information indicative of the object to process being which object of a color image, a glossy area, or a transparent image.

Next, the generating unit 309A performs rasterization process on the object to process so as to generate pixel data indicative of a position of each pixel, a density value of each pixel, and such (Step S520). At this time, as in the foregoing, the generating unit 309A sets, as a density value of each pixel, a density value of a drawing area before rasterization corresponding to the drawing area to process. The density value is only necessary, for example, to be read out from the above-described object list to acquire it.

Next, the calculating unit 309C calculates, for the object to process, the above-described first, area ratio, the fourth area ratio, or the second area ratio (Step S524). More specifically, when the object to process is a drawing area of a color image, the calculating unit 309C calculates the first area ratio of the drawing area specified by the first color plane image data in vector format in each pixel, in the second color plane image data. Furthermore, when the object to process is a drawing area of a transparent image, the calculating unit 309C calculates the fourth area ratio of the drawing area specified by the first clear plane image data in vector format in each pixel in the second clear plane image data. When the object to process is a drawing area of a glossy area, the calculating unit 309C calculates the second area ratio of the drawing area specified by the first gloss-control plane image data in vector format in each pixel in the second gloss-control plane image data. The object to process being which of a transparent image, a color image, or a glossy area is only necessary to read out the color space information acquired by the color space information acquiring unit 308 at Step S518 to determine it.

Next, the substituting unit 309E determines whether the object, to process is an object, of a glossy area (Step S526). The determination at Step S526 is only necessary to read out the color space information acquired by the color space information acquiring unit 308 at Step S518 to determine it.

When the object to process is an object of a glossy area, the substituting unit 809E makes an affirmative determination (Yes at Step S526) and the procedure moves on to Step S530. The substituting unit 309E then substitutes the second area ratio that is the area ratio calculated by the calculating unit 309C in the process at Step S524 with the third area ratio indicative of an area ratio of 100 percent (Step S530). The procedure then moves on to Step S528.

On the other hand, when the object to process is other than an object of a glossy area, i.e., a color image or a transparent image, the substituting unit 309E makes a negative determination (No at Step S526), and the procedure moves on to Step S528 without the substituting unit 309E performing the substitution of area ratios.

At Step S528, the correcting unit 309D performs correction process in which the density value of the pixel data generated at Step S520 is corrected (Step S528). Specifically, the correcting unit 309D corrects the density value of each pixel in the second color plane image data to a density value that is the density value multiplied by the first area ratio calculated by the calculating unit 309C. The correcting unit 309B further corrects the density value of each pixel in the second clear plane image data to a density value that is the density value multiplied by the fourth area ratio calculated by the calculating unit 309C. In contrast, for the density value of each pixel in the second gloss-control plane image data, the correcting unit 309B corrects it to a density value that is the density value multiplied by an area ratio of 100 percent substituted by the substituting unit 309E.

Meanwhile, when a negative; determination is made at Step S516 (No at Step S516) and an anti-aliasing process is not performed, as in the same manner as those at Step S520, the generating unit 309A performs rasterization process on the object to process so as to generate the pixel data indicative of a position of each pixel, a density value of each pixel, and such (Step S532).

As explained above, in the rendering engine 101 in the first embodiment, when an anti-aliasing process is performed, the first area ratio of the drawing area specified by the first color plane image data in vector format in each pixel in the second color plane image data is calculated. Furthermore, in the rendering engine 101, when the anti-aliasing process is performed, the fourth area ratio of the drawing area specified by the first clear plane image data in vector format in each pixel in the second clear plane image data is calculated. Moreover, in the rendering engine 101, when the anti-aliasing process is performed, the second area ratio of the drawing area specified by the first gloss-control plane image data in vector format in each pixel in the second gloss-control plane image data is calculated.

In addition, in the rendering engine 101, for the second gloss-control plane image data, the second area ratio is substituted with the third area ratio indicative of an area ratio of 100 percent.

In the rendering engine 101, when the anti-aliasing process is performed, the density value of each pixel in the second color plane image data is corrected to a density value that is the density value multiplied by the first area ratio, and the density value of each pixel in the second clear plane image data is corrected to a density value that is the density value multiplied by the fourth area ratio. Meanwhile, for the second gloss-control plane image data, in the rendering engine 101, when the anti-aliasing process is performed, the density value of each pixel in the second gloss-control plane image data is corrected to a density value that is the density value multiplied by the third area ratio (area ratio of 100 percent).

Figure 17A:
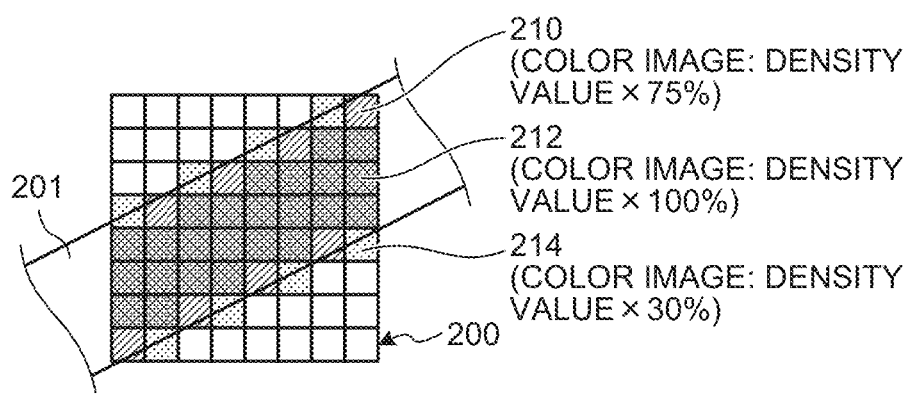
FIGS. 17A and 17B are schematic diagrams illustrating pixel data obtained by rasterization.
Figure 17B:
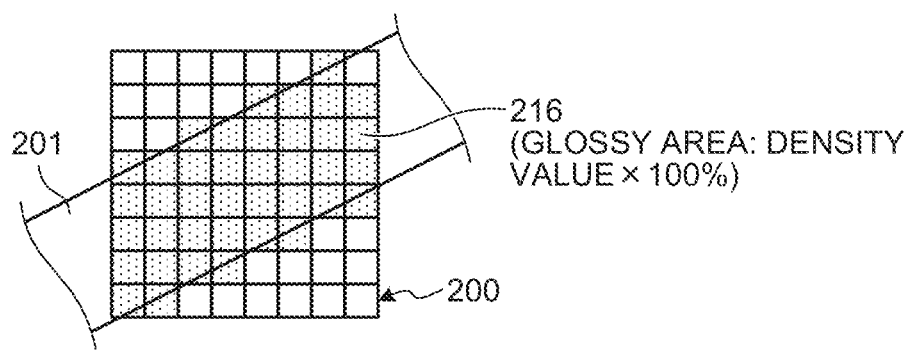

Accordingly, for example, as illustrated in FIG. 13A, a situation in which an image representing the diagonal line 201 with a line width of n points in vector format is converted into raster format composed of a plurality of pixel data and an anti-aliasing process is performed will be explained. In this case, when the anti-aliasing process is performed, the rendering engine 101 in the first embodiment performs the above-described processes, thereby suppressing the pixel position of a pixel the density value (pixel value) of which is not zero in the rasterized second color plane image data and the pixel position of a pixel the density value (pixel value) of which is not zero in the rasterized second gloss-control plane image data from being formed in disagreement on a recording medium. Specifically, the pixel positions of pixels 212 having a 100% area ratio that is the area ratio of a drawing area in the first color plane image data before rasterization in vector format in each pixel in the second color plane image data, those of pixels 210 having a 75%; area ratio, and those of pixels 214 having a 30% area ratio illustrated in FIG. 17A agree with the pixel positions of pixels 216 corresponding to a drawing area of a glossy area to add the surface effect represented by the second gloss-control plane image data illustrated in FIG. 17B.

As for the second gloss-control plane image data, the correction of density value is not performed, but the pixel data of density value corresponding to the type of the surface effect specified by the user is generated.

Consequently, the first embodiment can suppress the shape of end portion of the drawing area of a color image and that of the drawing area to which a surface effect is to be applied from being in disagreement when the foregoing are placed one on top of the other, and can apply a desired glossy effect to the area.

Second Embodiment

In a second embodiment, in addition to the process performed in the rendering engine 101 in the first embodiment, the density value used in an anti-aliasing process is adjusted in response to the density values of adjacent drawing areas when the drawing areas to add a surface effect lie adjacent to each other.

An image processing unit in the second embodiment is the same as that in the first embodiment, except for having a rendering engine 101A and a UI unit 111A in place of the rendering engine 101 and the UI unit 111 described in the first embodiment. Accordingly, different portions only will be explained, and the same reference numerals are given to the elements indicating the same function or configuration as those in the first embodiment, and their explanations are omitted.

FIG. 18 illustrates a functional block diagram of the rendering engine 101A.

The rendering engine 101A is electrically connected to the UI unit 111A. The UI unit 111A is an input device operated by the user when various operational instructions are given. The UI unit 111A includes, for example, buttons, a remote control unit receiver, and a card reader that reads information from an IC card and such. The UI unit 111A may be configured to include a keyboard. In the second embodiment, the UI unit 111A is operated by the user when the information indicative of the presence or absence of execution of an anti-aliasing process is entered. The UI unit 111A is further operated by the user, when drawing areas to which a surface effect is applied are adjacently set in the first gloss-control plane image data, to give information indicating that a density value; of which drawing area out of the adjacent drawing areas to be used as the density value of a pixel at the pixel position corresponding to the border thereof.

Figure 19A:
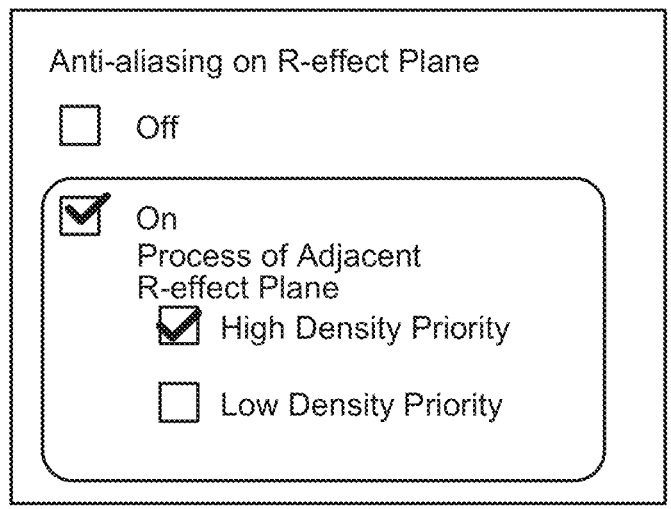
FIGS. 19A and 19B are schematic diagrams illustrating examples of an input screen.

For example, an input screen illustrated in FIG. 19A is displayed on the UI unit 111A. The input screen illustrated in FIG. 19A includes checkboxes to select whether to perform an anti-aliasing process, and checkboxes to select high density priority or low density priority when drawing areas of glossy areas to add a surface effect lie adjacent to each other. The high density priority means to indicate that, when drawing areas of glossy areas to add a surface effect lie adjacent to each other, a density value of the drawing area in which a higher density value is set is used as the density value of the pixel positioned at the border between the areas. The low density priority means to indicate that, when drawing areas of glossy areas to which a surface effect is applied lie adjacent to each other, a density value of the drawing area in which a lower density value is set is used as the density value of the pixel positioned at the border between the areas.

By the checkboxes indicated on the input screen being selected by the operational instructions of the user, the selected information is fed to the rendering engine 101A via the UI unit 111A.

Figure 19B:
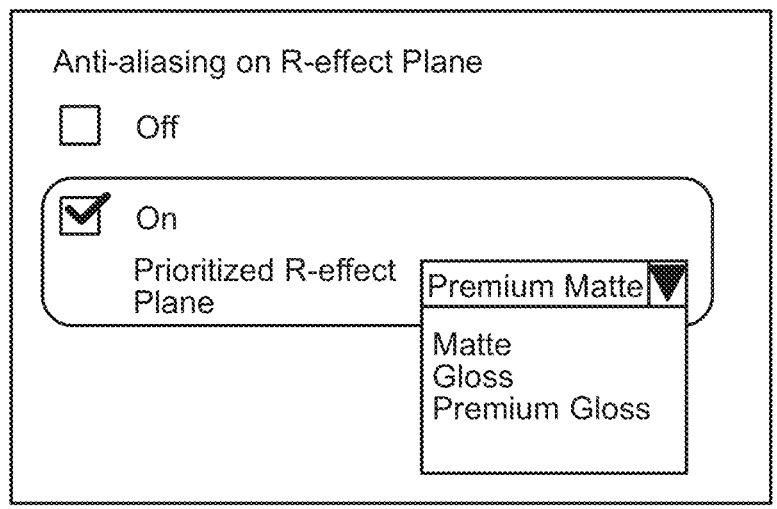

The UI unit 111A may be configured to display an input screen illustrated in FIG. 19B. The input screen illustrated in FIG. 19B indicates checkboxes to select whether to perform an anti-aliasing process, and indicates that, when drawing areas to which a surface effect is to be applied lie adjacent to each other, a density value corresponding to which glossy effect of "PM", "M", "G", or "PG" is used for the pixel data of the border between the areas.

By the checkboxes indicated on the input screen being selected by the operational instructions of the user, the selected information is fed to the rendering engine 101A via the UI unit 111A.

In the following, as one example, explained is a situation in which the input screen illustrated in FIG. 19A is displayed on the UI unit 111A, and the information indicative of whether an anti-aliasing process is performed and whether it is in high density priority or in low density priority when drawing areas to which a surface effect, is applied lie adjacent to each other is fed to the rendering engine 101A via the UI unit 111A.

Referring back to FIG. 18, the explanation is continued.

The rendering engine 101A includes the document data reading unit 300, the analyzing unit 302, the object structure list storage unit 304, the anti-aliasing determining unit 306, the color space information acquiring unit 308, and an anti-aliasing processing unit 310. The rendering engine 101A including the anti-aliasing processing unit 310 in place of the anti-aliasing processing unit 309 is different from that in the first embodiment.

The anti-aliasing processing unit 310 performs rasterization process on document data.

The anti-aliasing processing unit 310 includes the generating unit 309A, the calculating unit 309C, and the substituting unit 309E, and further includes a correcting unit 310D and a priority density determining unit 310F. The priority density determining unit 310F and the correcting unit 310D are different, from the first embodiment.

The priority density determining unit 310F determines, based or the information received from the UI unit 111A, whether it is in nigh density priority or in low density priority when drawing areas to which a surface effect is to be applied lie adjacent to each other.

The correcting unit 310D corrects, similarly to the correcting unit 309B in the first embodiment, (see FIG. 14), when the anti-aliasing determining unit 306 determines that an anti-aliasing process is performed, a density value of each pixel in the second color plane image data to a density value that, is the density value multiplied by the first area ratio calculated by the calculating unit 309C. The correcting unit 310D further corrects a density value of each pixel in the second clear plane image data to a density value that is the density value multiplied by the fourth area ratio calculated by the calculating unit 309C.

Meanwhile, for the density value of each pixel in the second gloss-control plane image data, the correcting unit 310D corrects it to a density value that is the density value multiplied by a 100 percent area ratio substituted by the substituting unit 309E (third area ratio).

In the second embodiment, when the drawing areas of glossy areas to which a surface effect, is to be applied lie adjacent to each other and the high density priority is set, the correcting unit 310D uses, for the pixels positioned at the border between the drawing areas, a density value of the drawing area on the side where a higher density value is set out of the adjacent drawing areas to which a surface effect, is to be applied as the density value to be multiplied by the third area ratio. In contrast, when the drawing areas of glossy areas to which a surface effect is to be applied lie adjacent to each other and the low density priority is set, the correcting unit 310D uses, for the pixels positioned at the border between the drawing areas, the density value of the drawing area on the side where a lower density value is set out of the adjacent, drawing areas to which a surface effect is to be applied as the density value to be multiplied by the area ratio.

Consequently, in the second embodiment, for the second gloss-control plane image data, the density value before correction is used as the density value regardless of the area ratio of a drawing area before rasterization in vector format in each pixel. However, in the second embodiment, when the drawing areas to which a surface effect is to be applied lie adjacent to each other, the density value of the drawing area on the side where the priority is set out of the adjacent drawing areas is used as the density value to be multiplied by the area ratio for the pixels positioned at the border between the drawing areas.

Next, the image processing performed in the rendering engine 101A thus configured in the second embodiment, will be explained.

Figure 20:
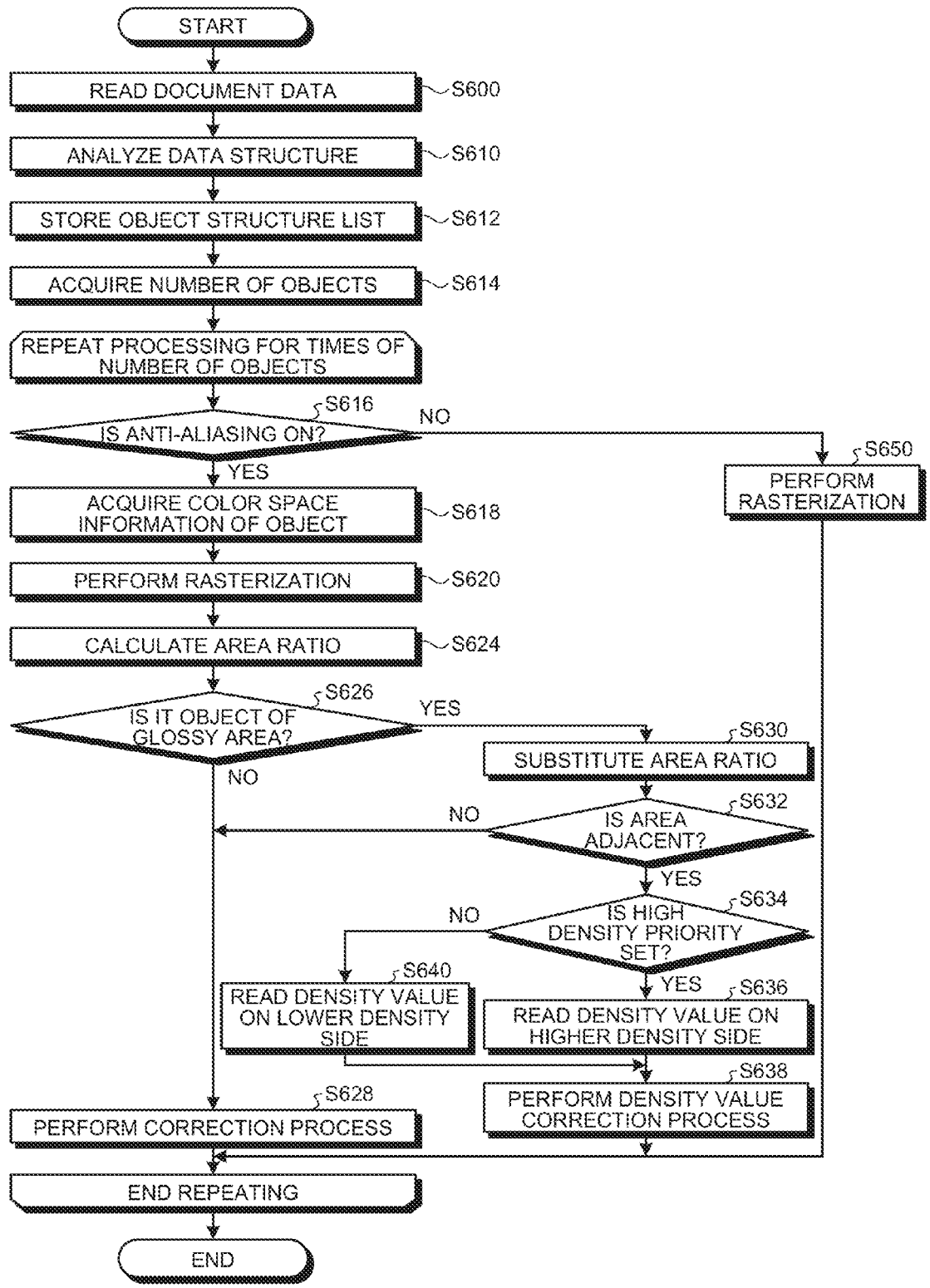
FIG. 20 is a flowchart illustrating a procedure of image processing performed by the image processing unit in the second embodiment.

FIG. 20 is a flowchart illustrating a procedure of image processing performed by the image processing unit 35A in the second embodiment.

The document data reading unit 300 first reads out document, data included in print data, and loads the document, data onto a primary memory omitted to illustrate (Step S600). Next, the analyzing unit 302 analyzes the data structure of the document data loaded at Step S600 to create an object structure list (Step S610). The analyzing unit 302 then stores the object structure; list that is an analysis result to a memory omitted to illustrate (Step S612).

Next, the rendering engine 101A reads out the object structure list stored in the memory and acquires the number of objects included in a single page of the document data (Step S614). The rendering engine 101A then repeats the processes at Step S616 to Step S650 for the number of objects acquired at Step S614.

The anti-aliasing determining unit 306 reads out the information indicative of the presence or absence of execution of an anti-aliasing process received from the UI unit 111A, and determines whether to perform an anti-aliasing process (Step S616).

When the anti-aliasing process is determined to be performed (Yes at Step S616), the color space information acquiring unit 308 acquires the information indicative of color space of an object (color space information) (Step S618). Next, the generating unit 309A performs rasterization process on the object to process so as to generate pixel data indicative of a position of each pixel, a density value of each pixel, and such (Step S620). At this time, as in the foregoing, the generating unit 309A sets, as a density value of each pixel, the density value of a drawing area before rasterization corresponding to the drawing area to process. The density value is only necessary, for example, to be read out from the above-described object list to acquire it.

Next, the calculating unit 309C calculates, for the object to process, the above-described first area ratio, the fourth area ratio, or the second, area ratio (Step S624). The substituting unit 309E then determines whether the object to process is an object of a glossy area (Step S626). The determination at Step S626 is only necessary to read out the color space information acquired by the color space information acquiring unit 308 at Step S618 to determine it.

When the object to process is an object of a glossy area, the substituting unit 309E makes an affirmative determination (Yes at Step S626) and the procedure moves on to Step S630. The substituting unit 309E then substitutes the second area ratio that is the area ratio calculated by the calculating unit 309C in the process at Step S624 with the third area ratio indicative of an area ratio of 100 percent (Step S630). The procedure then moves on to Step S632.

Next, the priority density determining unit 310F determines whether the drawing area to add a surface effect is adjacent to another one (Step S632). The priority density determining unit 310F determines, for a pixel positioned at a contour of the object to process, whether the color space information of an object corresponding to the pixel at a pixel position adjacent towards the outside of the object to process is a glossy area to make the determination at Step S632.

When the drawing area to add a surface effect is not adjacent to another, a negative determination is made (No at Step S632), and the procedure moves on to the above-described Step S628. On the other hand, when the drawing area, to add a surface effect, is adjacent to another one, an affirmative determination is made (Yes at Step S632), and the procedure moves on to Step S634.

Next, the priority density determining unit 310F determines whether high density priority is set based on the information received from the UI unit 111A (Step S634). When high density priority is set (Yes at Step S634), the procedure moves on to Step S636. The correcting unit 310D then reads out the density value on the side of a higher density as the density value of the pixel positioned at the border on the other adjacent drawing area to add a surface effect (Step S636).

In contrast, when low density priority is set (No at Step S634), the procedure moves on to Step S640. The correcting unit 310D then reads out the density value on the side of a lower density as the density value of the pixel positioned at the border on the other adjacent drawing area to which a surface effect is to be applied (Step S640).

The correcting unit 310D then performs the correction of density value, for the pixels other than the pixels positioned at the border on the other adjacent drawing area to which a surface effect is to be applied out of the respective pixels constituting the drawing area to which a surface effect is to be applied, by multiplying the density value of the drawing area to process represented by the first gloss-control plane image data in vector format by a 100 percent area ratio (third area ratio) calculated by the substituting unit 309E. In other words, the density value before correction is used as the density value of pixel data (Step S638).

Meanwhile, the correcting unit 310B performs the correction of density value, for the pixels positioned at the border on the other adjacent drawing area to which a surface effect, is to be applied out of the respective pixels constituting the drawing area to which a surface effect is to be applied, by multiplying the density value; read out at the above-described Step S636 or Step S640 by a 100 percent area ratio (third area ratio) calculated by the substituting unit 309E.

When a negative determination is made at Step S616 (No at Step S616) and an anti-aliasing process is not performed, similarly to Step S620, the generating unit 309A performs rasterization process on the object to process so as to generate pixel data indicative of a position of each pixel, a density value of each pixel, and such (Step S650).

As explained in the foregoing, in the rendering engine 101A in the second embodiment, when an anti-aliasing process is performed, the correcting unit 310D performs, for the second gloss-control plane image data, the correction of density value of each pixel on the pixels at the pixel position where the drawing areas before rasterization overlap by multiplying a density value before the correction by an area ratio calculated by the substituting unit 309E in response to the area ratio of the drawing area before rasterization in vector format in each pixel. In addition, when the drawing area to add a surface effect lies adjacent to another one and high density priority is set, the correcting unit 310D uses, for the pixels positioned at the border between the adjacent drawing areas, the density value of the drawing area on the side where a higher density value; is set out of the adjacent, drawing areas to which a surface effect, is to be applied is used as the density value to be multiplied by the area ratio. Meanwhile, when the drawing area to which a surface effect is to be applied lies adjacent to another one and low density priority is set, the correcting unit 310D uses, for the pixels positioned at the border between the adjacent drawing areas, the density value of the drawing area on the side where a lower density value is set out of the adjacent drawing areas to which a surface effect is to be applied is used as the density value to be multiplied by the area, ratio.

Accordingly, in the second embodiment, for the second gloss-control plane image data, the density value before correction is used regardless of the area ratio of drawing area before rasterization in vector format in each pixel. However, in the second embodiment, when the drawing area to add a surface effect lies adjacent to another one, the density value of the drawing area on the side where the priority is set out of the drawing areas is used for the pixel positioned at the border between the adjacent drawing areas as the density value to be multiplied by the area ratio.

Figure 21A:
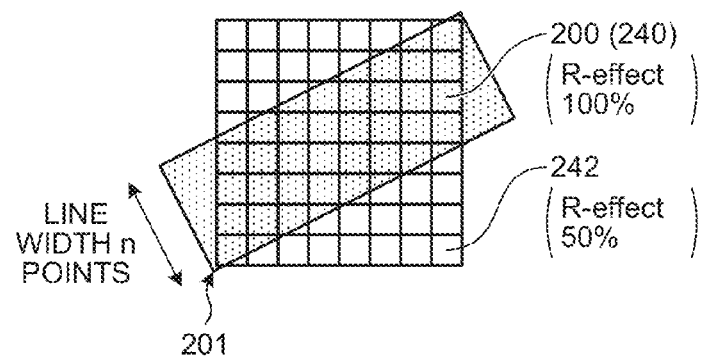
FIGS. 21A to 21D are schematic diagrams illustrating pixel data obtained by rasterization.

Therefore, for example, as illustrated in FIG. 21A, it is assumed that, in the second gloss-control plane image data, a glossy area 240 to add the type of a surface effect corresponding to a density value of 100% indicated by a diagonal line 200 with a line width of n points, and a glossy area 242 to which the type of a surface effect corresponding to a density value of 50% is to be applied are set adjacent to each other. Furthermore, it is assumed that, the glossy area 240 and the diagonal line 201 that is the drawing area represented by the second color plane image data are set to overlap.

Figure 21B:
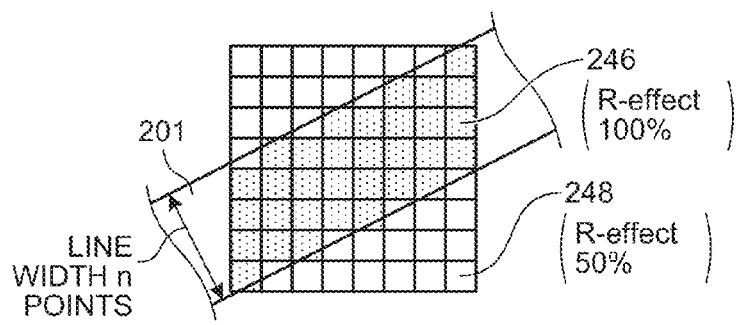

In this case, when an anti-aliasing process is not performed, as illustrated in FIG. 21B, the end portion of pixels 246 constituting the drawing area to which a surface effect is to be applied results in a jagged state.

Figure 21C:
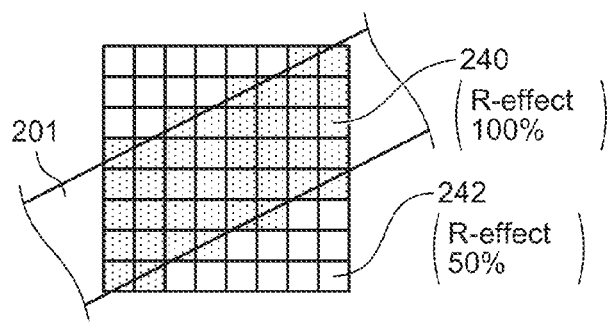
Figure 21D:
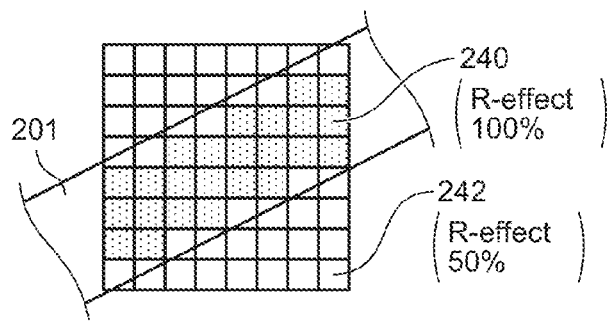

When an anti-aliasing process is performed and high density priority is set, as illustrated in FIG. 21C, the density value of pixels in the glossy area 240 to which the type of the surface effect, corresponding to a density value of 100% is to be applied, positioned at the border on the glossy area 242 to which the type of the surface effect corresponding to a density value of 50% is to be applied, is set to a density value of 100% (i.e., a value of 100% density value multiplied by 100% area ratio). In contrast, when low density priority is set, as illustrated in FIG. 21D, the density value of pixels in the glossy area 240 to which the type of the surface effect corresponding to a density value of 100% is to be applied, positioned at the border on the glossy area 242 to which the type of the surface effect corresponding to a density value of 50% is to be applied, is set to a density value of 50% (i.e., a value of 50% density value multiplied by 100% area ratio).

Consequently, the second embodiment can suppress the shapes of end portions from being in disagreement when the drawing area of a color image and the drawing area to which a surface effect is applied are placed one on top of the other, and can apply a desired glossy effect to the area.

While the embodiments of the present invention have been described in the foregoing, the present invention is not limited to the above-described embodiments, and thus it is possible to make various modifications without departing from a scope of the present invention.

For example, in the embodiments, a clear toner is exemplified to be used to print a transparent image or to add a surface effect. However, it only needs to be a color material that contains transparent developer and is not limited to toner. For example, in place of the clear toner, a transparent liquid developer may be used.

Third Embodiment

In the above-described embodiments, it is configured that the host device 10 generates print data and the rendering engine 101 of the DFE 30 performs rasterization process. However, it is not limited as such.

More specifically, it may be configured that any of a plurality of processes performed on a single device to be performed by one or more of other devices connected to the single device through a network.

As one example, in a printing system according to a third embodiment, a part of the functions of the DFE is implemented on a sever on a network.

Figure 22:
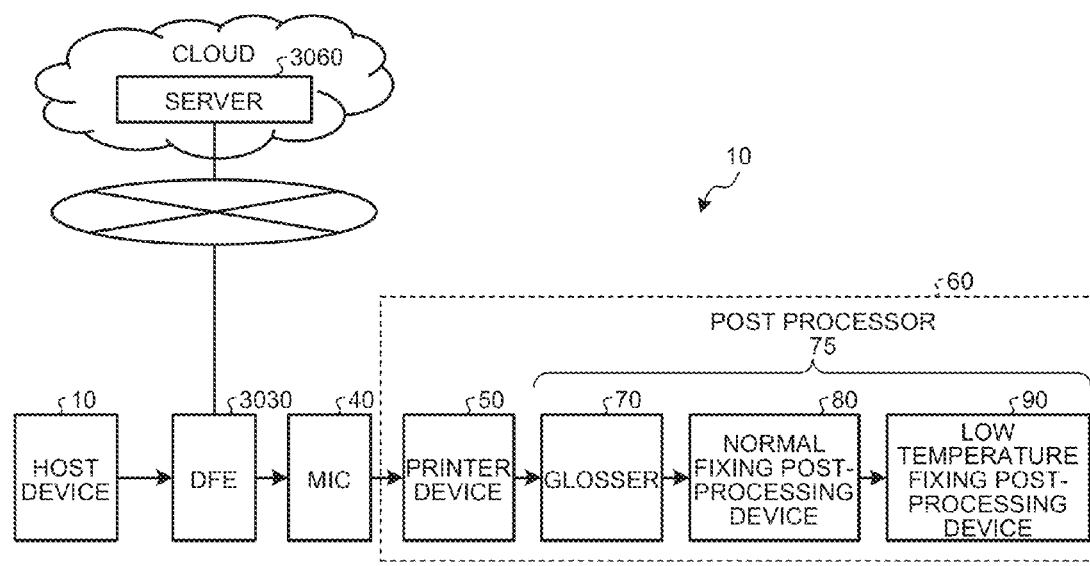
FIG. 22 is a diagram illustrating a configuration of a printing system.

FIG. 22 is a diagram illustrating a configuration of the printing system in the third embodiment. As illustrated in FIG. 22, the printing system in the third embodiment includes the host device 10, a DFE 3030, the MIC 40, and the printing apparatus 60.

In the third embodiment, the DFE 3030 is configured to be connected to a server 3060 through a network such as the Internet. In the third embodiment, it is configured that the function of the clear processing 103 of the DFE 30 in the first embodiment is provided on the server 3060.

The connection configuration of the host device 10, the DFE 3030, the MIC 40, and the printing apparatus 60 is the same as that in the first embodiment.

More specifically, in the third embodiment, it is configured that the DFE 3030 is connected to the single server 3060 through a network (cloud) such as the Internet, and the server 3060 is provided with the functions of the color space information acquiring unit (the color space information acquiring unit 308 in the first embodiment) and a rasterizing unit (anti-aliasing processing unit 3309 in the first embodiment) of the DFE 30 in the first embodiment so that the rasterization process and the anti-aliasing process are performed by the server 3060.

Figure 23:
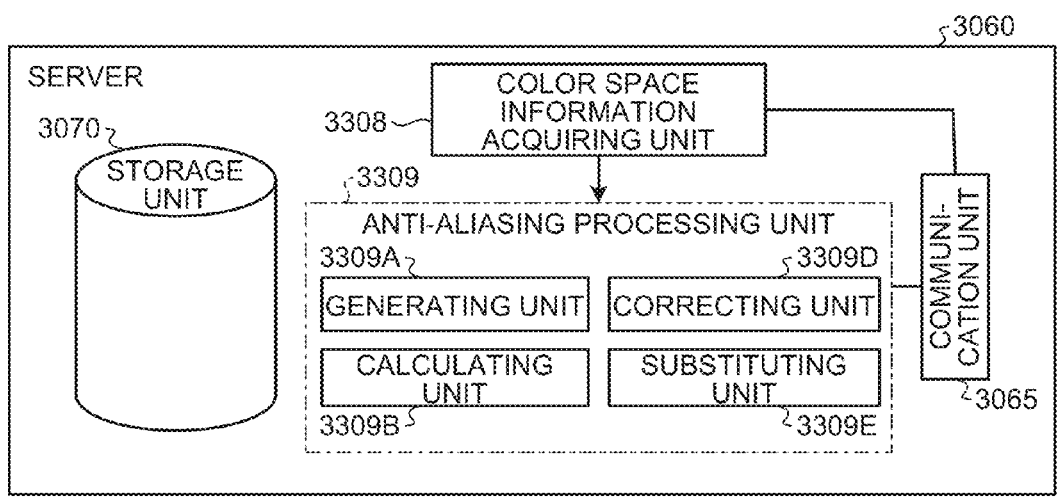
FIG. 23 is a block diagram illustrating a functional configuration of a server.

The server 3060 will be explained first. FIG. 23 is a block diagram; illustrating a functional configuration of the server 3060 in the third embodiment. The server 3060 mainly includes a storage unit 3070, a color space information acquiring unit 3308, an anti-aliasing processing unit 3309, and a communication unit 3065. The anti-aliasing processing unit 3309 includes a generating unit 3309A, a calculating unit 3309B, a correcting unit 3309D, and a substituting unit 3309E.

The storage unit 3070 is a storage medium such as an HDD and a memory. The communication unit 3065 transmits and receives various types of data and requests to and from the DFE 3030. More specifically, the communication unit 3065 receives first data from the DFE 3030. The communication unit 3065 transmits second data created by the anti-aliasing processing unit 3309 to the DFE 3030.

The first data includes document data (first color plane image data, first gloss-control plane image data, first clear plane image data), an object structure list of the document data, and information indicative of the presence or absence of execution of an anti-aliasing process.

The second data includes second color plane image data, second gloss-control plane image data, and second clear plane image data created by the anti-aliasing processing unit 3309.

The respective functions of the color space information acquiring unit 3308 and the anti-aliasing processing unit 3309 are the same as those of the color space; information acquiring unit 308 and the anti-aliasing processing unit 309 in the first embodiment.

Figure 24:
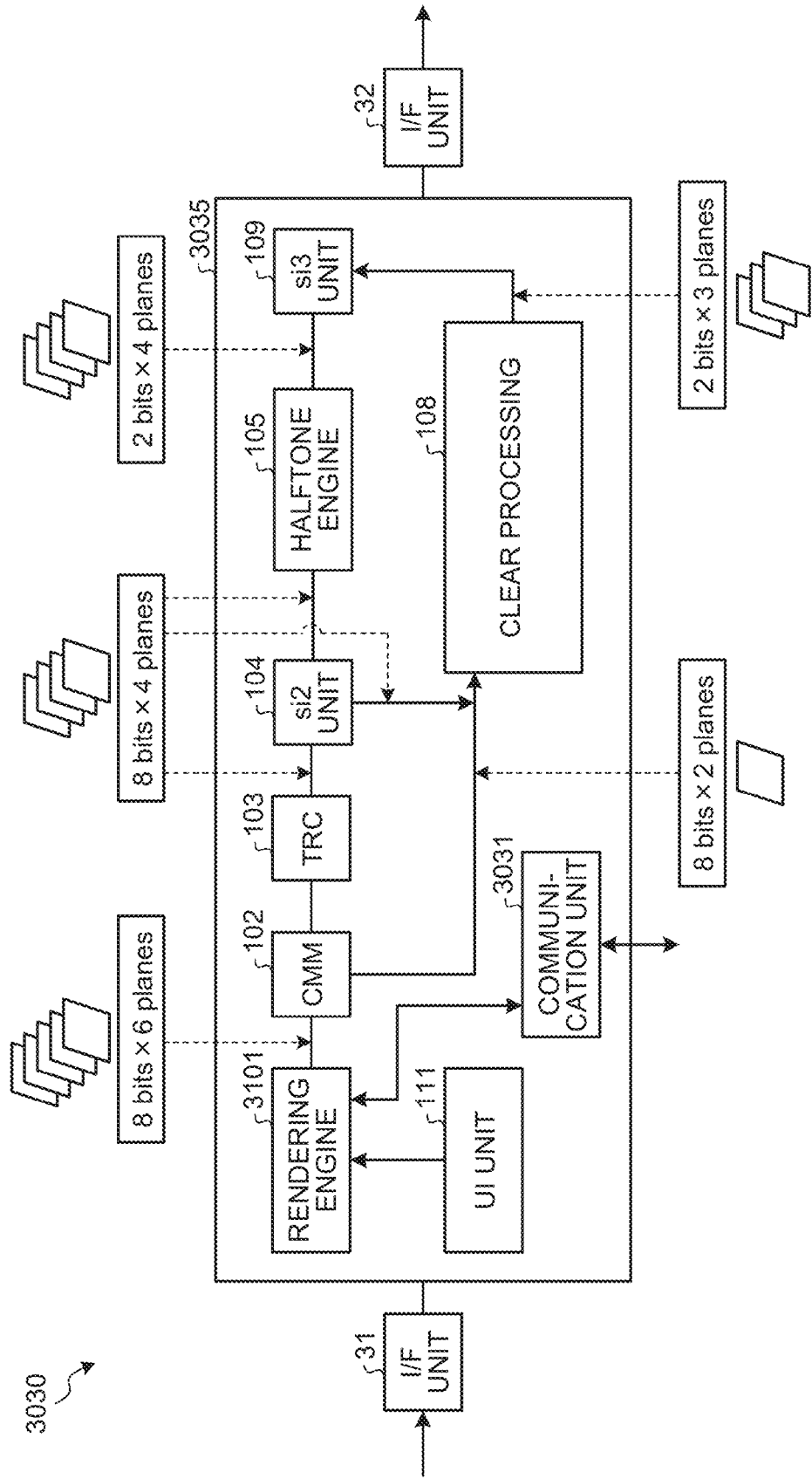
FIG. 24 is a block diagram illustrating a functional configuration of a DFE.

Next, the DFE 3030 will be explained. FIG. 24 is a block diagram illustrating a functional configuration of the DFE 3030 in the third embodiment. The DFE 3030 in the third embodiment is configured to include the I/F unit 31, the I/F unit 32, and an image processing unit 3035. The I/F unit 31 is an interface device to perform communication with the host device 10. The I/F unit 32 is an interface device to perform communication with the MIC 40.

The image processing unit 3035 is a unit to control the whole DFE 3030, and is a computer configured to include a CPU, a ROM, a RAM, and others. As illustrated in FIG. 24, the functions of the image processing unit 3035 include a rendering engine 3101, the UI unit 111, the CMM 102, the TRC 103, the si2 unit 104, the halftone engine 105, the clear processing 108, the si3 unit 109, a communication unit 3031, and others. The functions of the foregoing are realized by the CPU of the image processing unit 3035 loading various programs stored in the ROM and such onto the RAM and executing the programs. Furthermore, at least a part of the functions can be realized by an individual circuit (hardware).

The functions and configurations of the UI unit 111, the CMM 102, the TRC 103, the si2 unit 104, the halftone engine 105, the clear processing 108, and the si3 unit 109 are the same as those of the DFE 30 in the first embodiment.

The communication unit 3031 transmits and receives various types of data such as the second data to and from the server 3060 via an interface omitted to illustrate.

Figure 25:
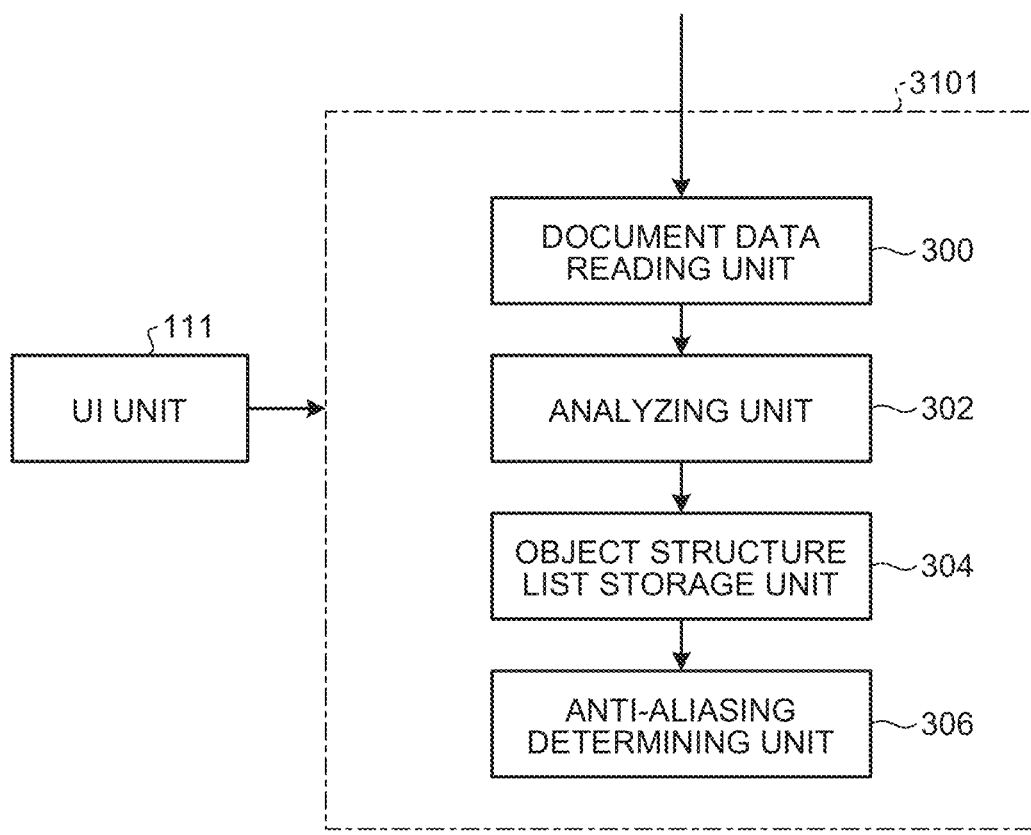
FIG. 25 is a schematic diagram illustrating a rendering engine.

FIG. 25 is a schematic diagram illustrating the rendering engine 3101.

The rendering engine 3101 is electrically connected to the UI unit 111. The UI unit 111 outputs the information indicative of the presence or absence of execution of an anti-aliasing process entered by the operational instructions of the user to the rendering engine 3101.

The rendering engine 3101 includes the document data reading unit 300, the analyzing unit 302, the object structure list storage unit 304, and the anti-aliasing determining unit 306. The foregoing are the same as those in the first embodiment.

Next, the image processing performed by the rendering engine 3101 in the third embodiment will be explained.

Figure 26:
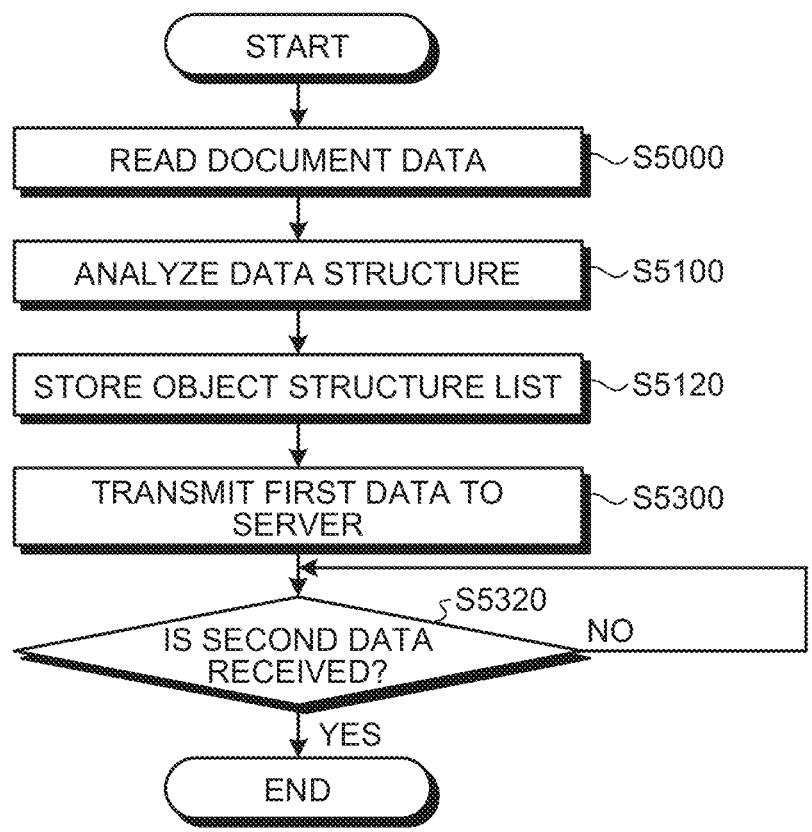
FIG. 26 is a flowchart illustrating a procedure of image processing performed by a rendering engine.

FIG. 26 is a flowchart illustrating a procedure of image processing performed by the rendering engine 3101 in the third embodiment.

In the rendering engine 3101, as in the same manner as those performed at Step S500 to Step S512 (see FIG. 16) by the rendering engine 101 in the first embodiment, the processes at Step S5000 to Step S5120 are performed.

Next, the rendering engine 3101 transmits the first data including the information indicative of the presence or absence of execution of an anti-aliasing process received from the UI unit 111, the document data (the first color plane image data, the first gloss-control plane image data, the first clear plane image data) read out at Step S5000, and the object structure list of the document data analyzed at Step S5100 to the server 3060 via the communication unit 3031 (Step S5300).

Next, the rendering engine 3101 repeats negative determination until the second data is received from the server 3060 (No at Step S5320). When an affirmative determination is made at Step S5320 (Yes at Step S5320), the present routine is terminated. As in the foregoing, the rendering engine 3101 further supplies the second color plane image data, the second gloss-control plane image data, and the second clear plane image data included in the second data to the CMM 102.

Next, the image processing performed by the server 3060 will be explained.

Figure 27:
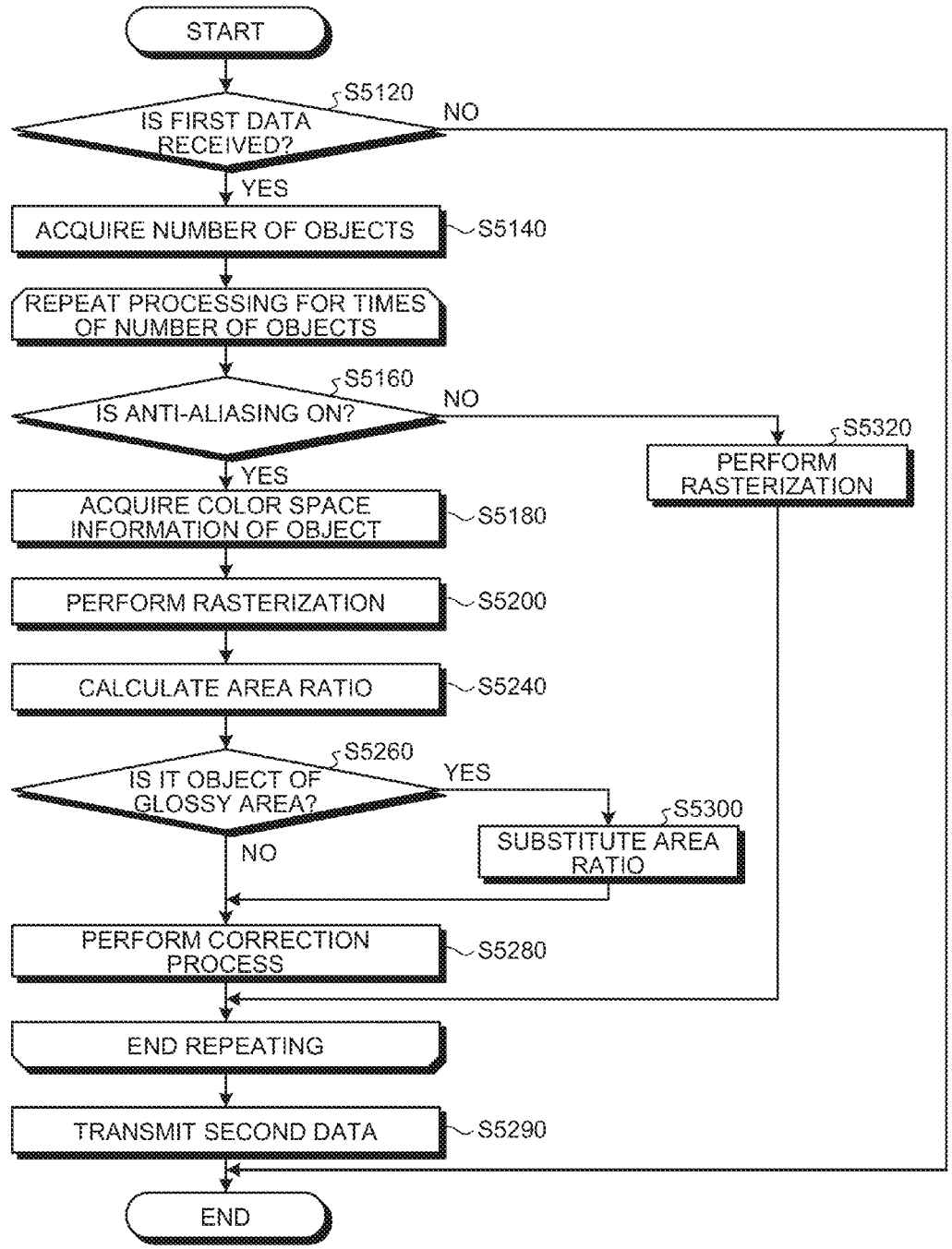
FIG. 27 is a flowchart illustrating a procedure of image processing performed by the server.

FIG. 27 is a flowchart illustrating a procedure of image processing performed by the server 3060 in the third embodiment.

The communication unit 3065 of the server 3060 first determines whether the first data is received from the DFE 3030 (Step S5120). When a negative determination is made at Step S5120 (No at Step S5120), the present routine is terminated. On the other hand, when an affirmative determination is made at Step S5120 (Yes at Step S5120), the procedure moves on to Step S5140.

Next, the server 3060 performs the processes at Step S5140 to Step S5280 as in the same manner as those performed at Step S514 to Step S528 (see FIG. 16) by the rendering engine 101 in the first embodiment.

More specifically, the server 3060 reads out the object structure list included in the first data acquired at the above-described Step S5120, and acquires the number of objects included in a single page in the document data included in the first data (Step S5140). The server 3060 then repeats the processes at Step S5160 to Step S5320 for the number of objects acquired at Step S5140.

The anti-aliasing processing unit 3309 first reads out the information indicative of the presence or absence of execution of an anti-aliasing process included in the first data, and determines whether to perform an anti-aliasing process (Step S5160).

When the anti-aliasing process is determined to be performed (Yes at Step S5160), the color space information acquiring unit 3308 acquires the information indicative of color space of the object (color space information) (Step S5180). The color space information acquiring unit 3308 acquires the color space information to acquire the information indicative of the object, to process being which object of a color image, a glossy area, or a transparent image.

Next, the generating unit 3309A performs rasterization process on the object to process so as to generate pixel data indicative of a position of each pixel, a density value of each pixel, and such (Step S5200).

Next, a calculating unit 3309C calculates, for the object to process, the above-described first area ratio, the fourth area ratio, or the second area ratio (Step S5240). The substituting unit 3309E then determines whether the object to process is an object of glossy area (Step S5260).

When the object to process is an object of glossy area, the substituting unit 3309E makes an affirmative determination (Yes at Step S5260) and the procedure moves on to Step S5300. The substituting unit 3309E then substitutes the second area ratio that is the area ratio calculated by the calculating unit 3309C in the process at Step S5240 with the third area ratio indicative of an area ratio of 100 percent (Step S5300). The procedure then moves on to Step S5280.

On the other hand, when the object to process is other than the object of glossy area, i.e., a color image or a transparent image, the substituting unit 3309E makes a negative determination (No at Step S5260), and the procedure moves on to Step S5280 without the substituting unit 3309E performing the substitution of area ratios.

At Step S5280, the correcting unit 3309D performs correction process in which the density value of the pixel data generated at Step S5200 is corrected (Step S5280).

Meanwhile, when a negative determination is made at Step S5160 (No at Step S5160) and an anti-aliasing process is not performed, as in the same manner as those performed at Step S5200, the generating unit 3309A performs rasterization process on the object to process so as to generate pixel data indicative of a position of each pixel, a density value of each pixel, and such (Step S5320).

Next, the communication unit 3065 transmits the second data including the second color plane image data, the second gloss-control plane image data, and the first clear plane image data created by the above-described processes to the DFE 3030 (Step S5290), and the present routine is terminated.

Accordingly, in the third embodiment, it is configured that a part of the functions of the DFE is provided on the server 3060, and the anti-aliasing process is performed by the server 3060 on a cloud. Consequently, other than the effects in the first embodiment, even when a plurality of DFE 3030 are present, the anti-aliasing process can be performed collectively, thereby being convenient, for an administrator.

In the third embodiment, it is configured that the function of the anti-aliasing process is provided on the single server 3060 on a cloud and the anti-aliasing process is performed on the server 3060. However, it is not limited as such.

For example, by providing two or more servers on a cloud, the two or more servers may be configured to perform the foregoing process being distributed over the servers.

Furthermore, the process performed by the host device 10 and a part of or the whole of the other processes performed by the DFE 3030 can be optionally provided collectively on a single server on a cloud or provided being distributed over a plurality of servers.

In other words, one or more of other devices connected to the single device through a network can be configured to perform any of a plurality of processes performed on a single device.

In the above-described configuration of performing the processes on one or more of other devices connected to the single device, the configuration includes input-output, process of data performed between the single device and the other device and that performed further between the other devices such as a process of outputting from the single device the data (information) generated by a process performed on the single device to the other device, and a process of the other device inputting the data.

More specifically, when the other device is one, the configuration includes the input-output process of data performed between the single device and the other device. When the other devices are two or more, the configuration includes the input-output process of data performed between the single device and the other device and between the other devices such as between a first other device and a second other device.

Moreover, while the server 3060 is provided on a cloud in the third embodiment, it is not limited to this. For example, one or more of servers such as the server 3060 may be configured to be provided on any network such as being provided on an intranet.

The present invention is not limited to the foregoing embodiments as is, and the invention can be embodied by modifying the constituent elements at an implementing stage without departing from a scope of the invention. Furthermore, by an appropriate combination of a plurality of the constituent elements disclosed in the embodiments, various inventions can be formed. For example, some constituent elements may be deleted from the whole constituent elements illustrated in the embodiments. Furthermore, the constituent elements may appropriately be combined over different embodiments. Moreover, various modifications are possible such as the ones illustrated in the following.

Figure 28:
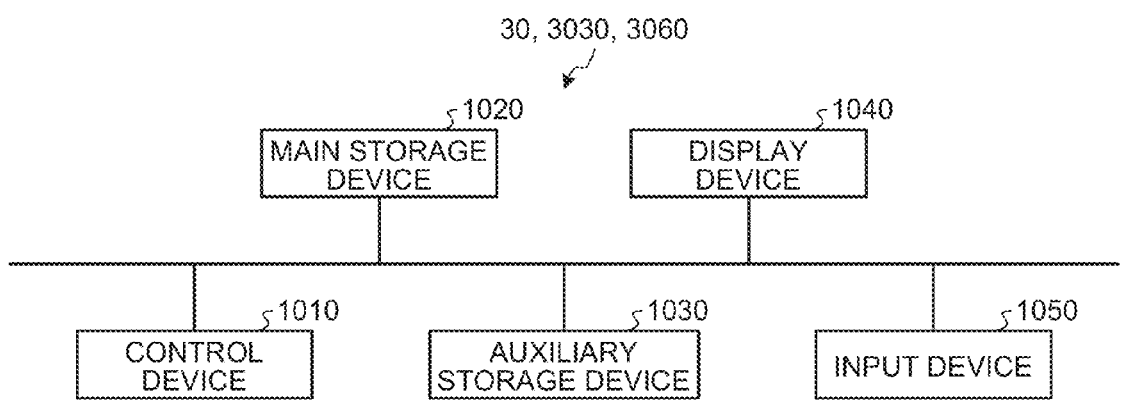
FIG. 28 is a block diagram illustrating a hardware configuration example of the DFE and the server.

FIG. 28 is a block diagram illustrating an example of a hardware configuration of the DFE 30, the DFE 3030, and the server 3060 in the above-described embodiments. Each of the DFE 30, the DFE 3030, and the server 3060 in the embodiments includes a control device 1010 such as a CPU, a main storage device 1020 such as a read only memory (ROM) and a random access memory (RAM), an auxiliary storage device 1030 such as an HDD and a CD-drive, a display device 1040 such as a display unit, and an input device 1050 such as a keyboard and a mouse, and is hardware configured using an ordinary computer.

The computer programs executed by the DFE 30, the DFE 3030, and the server 3060 in the embodiments are provided in a file of an installable format or an executable format recorded on a computer readable recording medium such as a compact disc-read only memory (CD-ROM), a flexible disk (FD), a compact disc-recordable (CD-R), and a digital versatile disk (DVD).

The control programs executed by the DFE 30, the DFE 3030, and the server 3060 in the embodiments may further be configured to be stored on a computer connected to a network such as the Internet and to be provided by downloading through the network. Furthermore, the control programs executed by the DFE 30, the DFE 3030, and the server 3060 in the embodiments may be configured to be provided or distributed through a network such as the Internet. Moreover, the program executed by the DFE 30, the DFE 3030, and the server 3060 in the embodiments may be configured to be provided being embedded in advance in a ROM or the like.

The programs executed by the DFE 30, the DFE 3030, and the server 3060 in the embodiments are modularly configured to include the respective units in the foregoing. As for the actual hardware, the CPU (processor) reads out the control program from the above-described storage medium and executes it to load the respective units into the main storage device, whereby the respective units (the rendering engine 101 (101A, 3101), the CMM 102, the TRC 103, the si2 unit 104, the halftone engine 105, the UI unit 111 (111A), the clear processing 108, the si3 unit 109, the color space information acquiring unit 3308, and the anti-aliasing processing unit 3309) are generated on the main storage device.

While the image forming system 100 is configured to include the host device 10, the DFE 30 (DFE 3030), the MIC 40, and the printing apparatus 60 in the above-described embodiments, it is not limited to this. For example, the host device 10, the DFE 30 (DFE 3030), the MIC 40, and the printing apparatus 60 may be integrally formed to be configured as a single image forming apparatus. Furthermore, the MIC 40 and the printer device 50 may be configured integrally.

While the printer system in the above-described embodiment is configured to include the MIC 40, it is not limited as such. The above-described process and function performed by the MIC 40 may be provided by other devices such as the DFE 30 (DFE 3030), and the system may be configured as the MIC 40 not being provided.

While the printing system in the above-described embodiment is configured to form an image using toners of a plurality of colors of CMYK, the system may be configured to form an image using a toner of a single color.

According to the embodiments, it is possible to provide an image processing apparatus, an image forming system, and a computer-readable storage medium that can suppress, when a drawing area of a color image and a drawing area to add a surface effect are placed one on top of the other, the shapes of end portions thereof from being in disagreement by an anti-aliasing process, and that can add a desired glossy effect to the area.

Although the invention has been described with respect to specific embodiments for a complete and clear disclosure, the appended claims are not to be thus limited but are to be construed as embodying all modifications and alternative constructions that, may occur to one skilled in the art that fairly fall within the basic teaching herein set forth.

What is claimed is:

1. An image processing apparatus comprising:
    an anti-aliasing processing unit configured to perform an anti-aliasing process on gloss-control plane image data that specifies a type of a surface effect applied to a recording medium and a drawing area to which the surface effect is to be applied to the recording medium and on color plane image data indicative of a drawing area of a color image, wherein
    the anti-aliasing processing unit corrects a pixel value of each pixel in the color plane image data to a value obtained by multiplying the pixel value by a first area ratio of a drawing area of the color plane image data before rasterization in each pixel, and corrects a pixel value of each pixel in the gloss-control plane image data to a value obtained by multiplying the pixel value by an area ratio of 100 percent,
    and wherein the anti-aliasing processing unit includes
    a generating unit configured to generate, based on document data including first color plane image data indicative of a color image to be printed using a color developer for each drawing area in vector format and first gloss-control plane image data indicative of a type of a surface effect and a glossy area to which the surface effect is to be applied for each drawing area in vector format, second color plane image data as the color plane image data that defines a density value of a drawing area of the color image for each pixel and second gloss-control plane image data as the gloss-control plane image data that defines a density value corresponding to the type of a surface effect for each pixel of a drawing area,
    a calculating unit configured to calculate the first area ratio of the drawing area specified by the first color plane image data in vector format in each pixel of the second color plane image data, and to calculate a second area ratio of the drawing area specified by the first gloss-control plane image data in vector format in each pixel of the second gloss-control plane image data,
    a substituting unit configured to substitute the second area ratio of each pixel in the second gloss-control plane image data with a third area ratio indicative of an area ratio of 100 percent, and
    a correcting unit configured to correct a density value of each pixel of the second color plane image data to a value obtained by multiplying the density value by the first area ratio, and corrects a density value of each pixel of the second gloss-control plane image data to a value obtained by multiplying the density value by the third area ratio.

2. The image processing apparatus according to claim 1, wherein the correcting unit corrects, when drawing areas to which different surface effects are to be applied are adjacently set in the first gloss-control plane image data, a density value of a pixel positioned at a border between the drawing areas to which different surface effects are to be applied out of pixels of the second gloss-control plane image data to a value obtained by multiplying a density value in a prioritized drawing area set in advance out of the adjacent drawing areas by the third area ratio.

3. The image processing apparatus according to claim 2, further comprising an input unit configured to input priority information indicative of the prioritized drawing area.

4. An image forming system comprising:
    a printing apparatus; and
    an image processing apparatus, wherein
    the image processing apparatus includes an anti-aliasing processing unit configured to perform an anti-aliasing process on gloss-control plane image data that specifies a type of a surface effect applied to a recording medium and a drawing area to which the surface effect is to be applied to the recording medium and on color plane image data indicative of a drawing area of a color image, wherein
    the anti-aliasing processing unit corrects a pixel value of each pixel in the color plane image data to a value obtained by multiplying the pixel value by a first area ratio of a drawing area of the color plane image data before rasterization in each pixel, and corrects a pixel value of each pixel in the gloss-control plane image data to a value obtained by multiplying the pixel value by an area ratio of 100 percent, and
    the printing apparatus forms an image on the recording medium based on the corrected color plane image data and the corrected gloss-control plane image data,
    and wherein the anti-aliasing processing unit includes
    a generating unit configured to generate, based on document data including first color plane image data indicative of a color image to be printed using a color developer for each drawing area in vector format and first gloss-control plane image data indicative of a type of a surface effect and a glossy area to which the surface effect is to be applied for each drawing area in vector format, second color plane image data as the color plane image data that defines a density value of a drawing area of the color image for each pixel and second gloss-control plane image data as the gloss-control plane image data that defines a density value corresponding to the type of a surface effect for each pixel of a drawing area,
    a calculating unit configured to calculate the first area ratio of the drawing area specified by the first color plane image data in vector format in each pixel of the second color plane image data, and to calculate a second area ratio of the drawing area specified by the first gloss-control plane image data in vector format in each pixel of the second gloss-control plane image data,
    a substituting unit configured to substitute the second area ratio of each pixel in the second gloss-control plane image data with a third area ratio indicative of an area ratio of 100 percent, and
    a correcting unit configured to correct a density value of each pixel of the second color plane image data to a value obtained by multiplying the density value by the first area ratio, and corrects a density value of each pixel of the second gloss-control plane image data to a value obtained by multiplying the density value by the third area ratio.

5. A non-transitory computer-readable storage medium with an executable program stored thereon, wherein the program instructs a processor to perform:

performing an anti-aliasing process on gloss-control plane image data that specifies a type of a surface effect applied to a recording medium and a drawing area to which the surface effect is to be applied to the recording medium and on color plane image data indicative of a drawing area of a color image, wherein the anti-aliasing process includes correcting a pixel value of each pixel in the color plane image data to a value obtained by multiplying the pixel value by a first area ratio of a drawing area of the color plane image data before rasterization in each pixel; and correcting a pixel value of each pixel in the gloss-control plane image data to a value obtained by multiplying the pixel value by an area ratio of 100 percent, and wherein the anti-aliasing process further includes generating, based on document data including first color plane image data indicative of a color image to be printed using a color developer for each drawing area in vector format and first gloss-control plane image data indicative of a type of a surface effect and a glossy area to which the surface effect is to be applied for each drawing area in vector format, second color plane image data as the color plane image data that defines a density value of a drawing area of the color image for each pixel and second gloss-control plane image data as the gloss-control plane image data that defines a density value corresponding to the type of a surface effect for each pixel of a drawing area, calculating the first area ratio of the drawing area specified by the first color plane image data in vector format in each pixel of the second color plane image data, and calculating a second area ratio of the drawing area specified by the first gloss-control plane image data in vector format in each pixel of the second gloss-control plane image data, substituting the second area ratio of each pixel in the second gloss-control plane image data with a third area ratio indicative of an area ratio of 100 percent, and correcting a density value of each pixel of the second color plane image data to a value obtained by multiplying the density value by the first area ratio, and correcting a density value of each pixel of the second gloss-control plane image data to a value obtained by multiplying the density value by the third area ratio.

* * * * *